US010057855B2

(12) United States Patent
Bashar et al.

(10) Patent No.: US 10,057,855 B2
(45) Date of Patent: Aug. 21, 2018

(54) SCHEDULING SYNCHRONIZATION SIGNALS IN A NEW CARRIER TYPE

(71) Applicant: INTEL CORPORATION, Santa Clara, CA (US)

(72) Inventors: Shafi Bashar, Santa Clara, CA (US); Jong-Kae Fwu, Sunnyvale, CA (US); Hong He, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 166 days.

(21) Appl. No.: 14/887,103

(22) Filed: Oct. 19, 2015

(65) Prior Publication Data

US 2016/0044615 A1 Feb. 11, 2016

Related U.S. Application Data

(63) Continuation of application No. 13/751,488, filed on Jan. 28, 2013, now abandoned.

(Continued)

(51) Int. Cl.
*H04W 52/02* (2009.01)
*H04W 36/00* (2009.01)
(Continued)

(52) U.S. Cl.
CPC .......... *H04W 52/0235* (2013.01); *H04B 1/56* (2013.01); *H04B 7/024* (2013.01);
(Continued)

(58) Field of Classification Search
None
See application file for complete search history.

(56) References Cited

U.S. PATENT DOCUMENTS 8,289,917 B1 * 10/2012 Koivisto ............... H04L 5/0048 370/252
9,781,692 B2 * 10/2017 Gou .................. H04W 56/0015
(Continued)

FOREIGN PATENT DOCUMENTS

EP 2595336 A1 5/2013
WO WO 2013/170104 A1 11/2013

OTHER PUBLICATIONS

Evolved Universal Terrestrial Radio Access (E-UTRA); Physical Channels and Modulation (Release 10), 3GPP TS 36.211 V10.2.0, 103 pages.

(Continued)

*Primary Examiner* — Samina Choudhry
*Assistant Examiner* — Peter Chen
(74) *Attorney, Agent, or Firm* — Thorpe North & Western

(57) ABSTRACT

Technology is discussed for supporting the incorporation of a Primary Synchronization Signal (PSS) and/or a Secondary Synchronization Signal (SSS) within in a New Carrier Type (NCT) for a Component Carrier (CC). Guidelines for incorporating the PSS and/or the SSS in the NCT are discovered, together with potential collisions with other signals that can be avoided for various scenarios. In some examples, various guidelines and potential collisions discovered herein, for various scenarios, inform approaches to incorporating the PSS and/or the SSS based on the positioning of the PSS and/or the SSS. In other examples, other signals, such as DeModulation Reference Symbols (DMRS) are reconfigured to allow incorporation of the PSS and the SSS.

30 Claims, 12 Drawing Sheets

Related U.S. Application Data

(60) Provisional application No. 61/646,223, filed on May 11, 2012.

(51) Int. Cl.

| | |
|---|---|
| ***H04W 36/22*** | (2009.01) |
| ***H04W 36/32*** | (2009.01) |
| ***H04W 36/04*** | (2009.01) |
| ***H04W 36/16*** | (2009.01) |
| ***H04W 36/30*** | (2009.01) |
| ***H04W 76/16*** | (2018.01) |
| ***H04W 4/90*** | (2018.01) |
| ***H04W 4/06*** | (2009.01) |
| ***H04B 7/26*** | (2006.01) |
| ***H04J 3/16*** | (2006.01) |
| ***H04L 29/02*** | (2006.01) |
| ***H04L 5/00*** | (2006.01) |
| ***H04W 76/14*** | (2018.01) |
| ***H04W 24/10*** | (2009.01) |
| ***H04W 72/04*** | (2009.01) |
| ***H04W 72/08*** | (2009.01) |
| ***H04J 3/00*** | (2006.01) |
| ***H04B 1/56*** | (2006.01) |
| ***H04W 56/00*** | (2009.01) |
| ***H04W 4/22*** | (2009.01) |
| ***H04W 88/06*** | (2009.01) |
| ***H04B 15/00*** | (2006.01) |
| ***H04B 7/024*** | (2017.01) |
| ***H04B 7/0456*** | (2017.01) |
| ***H04B 7/06*** | (2006.01) |
| ***H04W 24/02*** | (2009.01) |
| ***H04W 72/12*** | (2009.01) |
| ***H04W 48/20*** | (2009.01) |
| ***H04W 16/14*** | (2009.01) |
| ***H04L 29/06*** | (2006.01) |
| ***H04W 4/02*** | (2018.01) |
| ***H04W 76/02*** | (2009.01) |
| ***H04J 3/26*** | (2006.01) |
| ***H04L 27/26*** | (2006.01) |
| ***H04W 72/10*** | (2009.01) |
| ***H04L 5/14*** | (2006.01) |
| ***H04W 4/16*** | (2009.01) |
| ***H04W 72/00*** | (2009.01) |
| ***H04B 7/0417*** | (2017.01) |
| *H04W 36/18* | (2009.01) |
| *H04W 72/02* | (2009.01) |
| *H04L 1/00* | (2006.01) |
| *H04L 1/18* | (2006.01) |
| *H04W 88/02* | (2009.01) |
| *H04W 88/08* | (2009.01) |

(52) U.S. Cl.

CPC ......... *H04B 7/0417* (2013.01); *H04B 7/0456* (2013.01); *H04B 7/0473* (2013.01); *H04B 7/0486* (2013.01); *H04B 7/063* (2013.01); *H04B 7/065* (2013.01); *H04B 7/0626* (2013.01); *H04B 7/0632* (2013.01); *H04B 7/0639* (2013.01); *H04B 7/0647* (2013.01); *H04B 7/26* (2013.01); *H04B 15/00* (2013.01); *H04J 3/00* (2013.01); *H04J 3/1694* (2013.01); *H04J 3/26* (2013.01); *H04L 5/001* (2013.01); *H04L 5/0007* (2013.01); *H04L 5/0035* (2013.01); *H04L 5/0096* (2013.01); *H04L 5/14* (2013.01); *H04L 5/1469* (2013.01); *H04L 27/2627* (2013.01); *H04L 29/02* (2013.01); *H04L 69/22* (2013.01); *H04W 4/023* (2013.01); *H04W 4/06* (2013.01); *H04W 4/16* (2013.01); *H04W 4/22* (2013.01); *H04W 4/90* (2018.02); *H04W 16/14* (2013.01); *H04W 24/02* (2013.01); *H04W 24/10* (2013.01); *H04W 36/00* (2013.01); *H04W 36/0055* (2013.01); *H04W 36/0061* (2013.01); *H04W 36/0088* (2013.01); *H04W 36/04* (2013.01); *H04W 36/16* (2013.01); *H04W 36/22* (2013.01); *H04W 36/32* (2013.01); *H04W 48/20* (2013.01); *H04W 52/0209* (2013.01); *H04W 52/0212* (2013.01); *H04W 52/0216* (2013.01); *H04W 52/0225* (2013.01); *H04W 52/0229* (2013.01); *H04W 52/0251* (2013.01); *H04W 56/00* (2013.01); *H04W 56/001* (2013.01); *H04W 72/005* (2013.01); *H04W 72/042* (2013.01); *H04W 72/044* (2013.01); *H04W 72/048* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/12* (2013.01); *H04W 72/1215* (2013.01); *H04W 76/023* (2013.01); *H04W 76/14* (2018.02); *H04W 88/06* (2013.01); *H04L 1/0026* (2013.01); *H04L 1/1803* (2013.01); *H04L 1/1822* (2013.01); *H04L 5/0053* (2013.01); *H04L 5/0073* (2013.01); *H04W 4/02* (2013.01); *H04W 36/18* (2013.01); *H04W 36/30* (2013.01); *H04W 72/02* (2013.01); *H04W 72/1226* (2013.01); *H04W 88/02* (2013.01); *H04W 88/08* (2013.01); *Y02B 60/50* (2013.01); *Y02D 70/00* (2018.01)

(56) References Cited

U.S. PATENT DOCUMENTS

| | | | | | |
|---|---|---|---|---|---|
| 2010/0104034 | A1* | 4/2010 | Nam | H04L 5/0007 | 375/260 |
| 2010/0273506 | A1* | 10/2010 | Stern-Berkowitz | G01S 5/0009 | 455/456.1 |
| 2013/0094411 | A1* | 4/2013 | Zhang | H04W 72/04 | 370/281 |
| 2013/0208678 | A1* | 8/2013 | Zhang | H04L 5/0053 | 370/329 |
| 2013/0265945 | A1* | 10/2013 | He | H04L 27/2657 | 370/329 |
| 2013/0344909 | A1* | 12/2013 | Davydov | H04B 7/0689 | 455/501 |
| 2015/0016239 | A1* | 1/2015 | Yi | H04J 11/003 | 370/201 |

OTHER PUBLICATIONS

L TE, E-UTRA, "Physical channels and modulation", (3GPP TS 36.211 version 8.8.0 Release 8), Oct. 2009, 85 Pages.

LG Electronics, "Considerations on Primary and Second Synchronization Signal for New Carrier Type" R 1-121423, 3GPP TSG RAN WG1#68bis, Jeju, Korea, Mar. 26-30, 2012, 3 Pages.

NEC Group, "Configurable Time-Frequency locations for PSS/SSS signals on the NCT" R1- 121329, 3GPP TSG RAN WG1#68bis, Jeju, Korea, Mar. 26-30, 2012, 6 Pages.

NEC Group, "Discussion on time and frequency synchronisation for the Additional Carrier type" R1-120247, 3GPP TSG RAN WG1#68, Dresden, Germany, Feb. 6-10, 2012, 4 Pages.

Nokia Siemens Networks et al, "Performance of Time/Frequency Tracking on New Carrier Type", 3GPP TSG-RAN WG1 R1-120709, Discussion and Decision, Feb. 2012, Meeting 68, Agenda 7.2.2.1, pp. 4, Dresden, Germany.

(56) References Cited

OTHER PUBLICATIONS

Samsung, "Synchronization signal mapping for the new carrier type" R1-121617, 3GPP TSG RAN WG1#68bis, Jeju, Korea, Mar. 26-30, 2012, 3 Pages.
Samsung, "Time and Frequency Synchronization on Additional Type Carriers", Discussion and Decision, 3GPP TSG WG1 R1-114220, Nov. 2011, Meeting 67, Agenda 7.2.2, pp. 4, San Francisco, USA.

* cited by examiner

500b

500a

SCHEDULING SYNCHRONIZATION SIGNALS IN A NEW CARRIER TYPE

RELATED APPLICATIONS

This application is a continuation of application Ser. No. 13/751,488, filed Jan. 28, 2013, which claims the benefit of and incorporates by reference U.S. Provisional Patent Application Ser. No. 61/646,223, filed May 11, 2012.

BACKGROUND

The increasing use of data intensive services, such as streaming video, over Wireless Wide Area Networks (WWANs) places increased demand on those networks for higher data rates. One way of increasing the amount of data communicated over a WWAN is the use of Carrier Aggregation (CA). Carriers comprise spans of radio spectrum over which a WWAN can communicate information. Since the date rates for this information are limited by the carrier's bandwidth and since bandwidths of continuous spans of radio spectrum for carriers are often limited in size, especially in privately owned portions of the radio spectrum, combining multiple carriers through carrier aggregation can increase data rates.

To harness the potential for increased data rates to meet increasing demand, wireless standards, such as the Third Generation Partnership Project (3GPP) Long Term Evolution (LTE) standards, provide specifications for CA. As an extension of those specifications, Working Group (WG) 1 of the Technical Specification Group (TSG) for the Radio Access Network (RAN) has discussed the introduction of a New Carrier Type for CA. Some motivations for introducing the NCT include enhanced spectral efficiency, improved support for a heterogeneous network, and energy efficiency.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
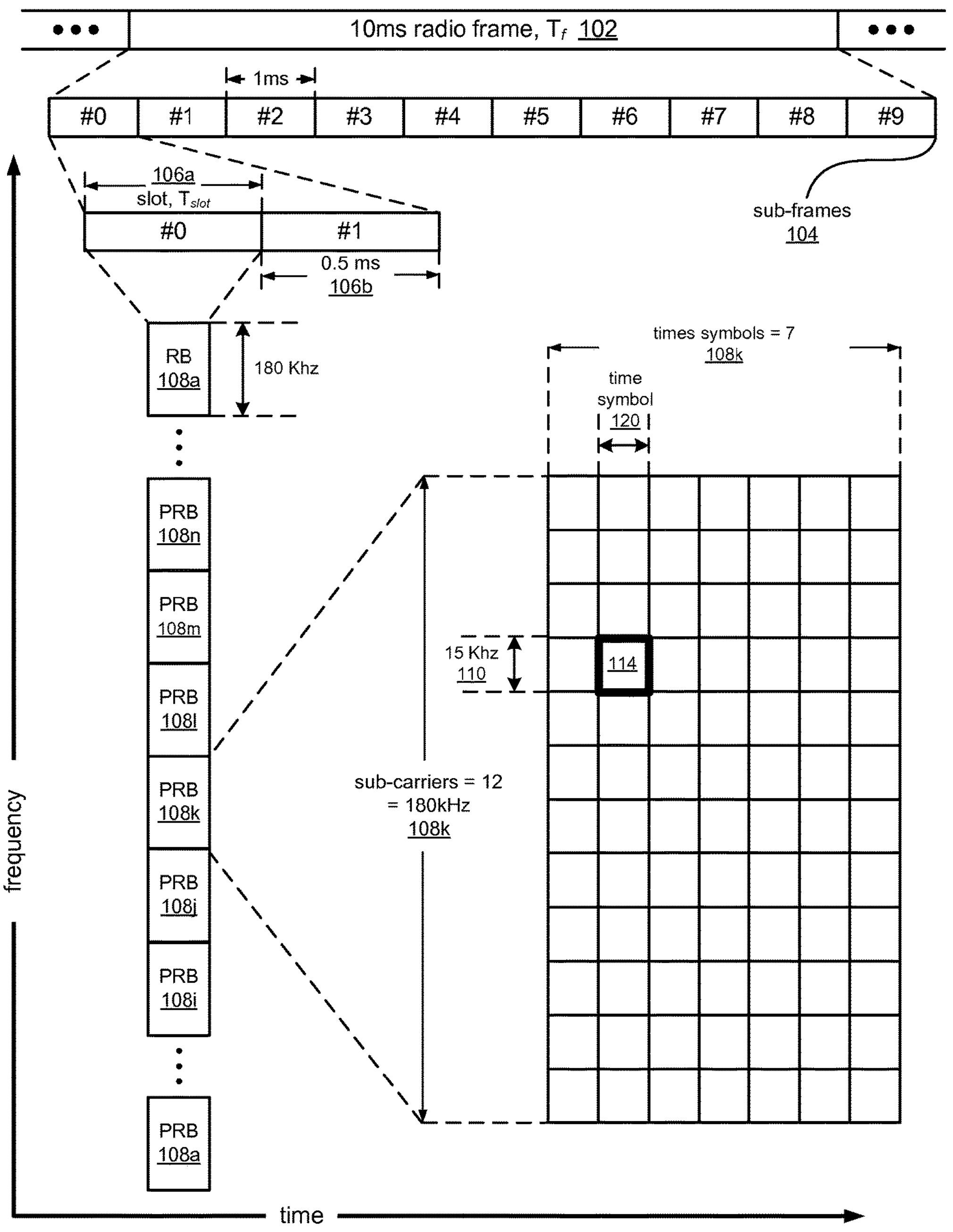
FIG. 1 is a block diagram illustrating a radio frame for an Orthogonal Frequency Division Multiplexing (OFDM) transmission scheme consistent with the Third Generation Partnership Project (3GPP) Long Term Evolution (LTE) standards and its constitutive elements with respect to both time and frequency.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As used herein, the term “substantially” refers to the complete or nearly complete extent or degree of an action, characteristic, property, state, structure, item, or result. For example, an object that is “substantially” enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Other terms may be defined elsewhere in the body of this specification.

Example Embodiments

An initial overview of technology embodiments is provided below and then specific technology embodiments are described in further detail later. This initial summary is intended to aid readers in understanding the technology more quickly but is not intended to identify key features or essential features of the technology, nor is it intended to limit the scope of the claimed subject matter.

Working Group (WG) 1 of the Technical Specification Group (TSG) for the Radio Access Network (RAN) has proposed to create a New Carrier Type (NCT). In one embodiment, the NCT may be either a synchronized carrier or an unsynchronized carrier. As used herein, a "synchronized carrier" is a carrier where legacy and/or additional carriers are synchronized in time and frequency to the extent that no separate synchronization processing is needed in a receiver. Also, as used herein, an "unsynchronized carrier" is a carrier where legacy and/or additional carriers are not synchronized with the same degree of accuracy as for the synchronized carriers. For purposes of these definitions, whether a carrier is synchronized is determined from the perspective of the receiver.

A Primary Synchronization Signal (PSS) sequence and/or a Secondary Synchronization Signal (SSS) sequence, as defined in Release 8 of the Third Generation Partnership Project (3GPP) Long Term Evolution (LTE) standards, can be transmitted in the NCT. Under current standards, the term "PSS" is a sequence, based on a Zadoff-Chu (ZC) sequence, transmitted for each cell associated with an evolved Node B (eNodeB) every 5 milliseconds (ms). However, future modifications of the PSS can be consistent with examples disclosed herein. A PSS can be used by a Universal Equipment (UE) to obtain slot synchronization and/or as part of a physical layer cell IDentifier (cell ID). Three different sequences exist for three different cell IDs within each of 168 groups of cell IDs. Additional implementation details for a PSS sequence can be found in 3GPP LTE Release 10 Technical Specification (TS) 36.211, Section 6.11.1.

Also, under current standards, the term "SSS" is a sequence, transmitted twice in each 10 ms frame, that can be used by a UE to detect the LTE frame timing. However, future modifications of the SSS can be consistent with examples disclosed herein. The SSS can also be used by the UE to obtain the physical layer cell identity group. An SSS sequence is based on a maximum length sequence (M-sequence). The M-sequence can comprise two different length-31 Binary Phase Shift Keying (BPSK)-modulated sequences interleaved in the frequency domain. The different modulated sequences are two different cyclic shifts of a single length-31 M-sequence, wherein the cyclic shift indices of the M-sequences are derived from a physical layer cell identity group. Since the two different modulated sequences are alternated between the first and second SSS transmissions in each radio frame, a UE can determine the 10 ms radio frame timing from a single observation of an SSS. Additional implementation details for an SSS sequence can be found in 3GPP LTE Release 10 TS 36.211, Section 6.11.1.

Figure 6:
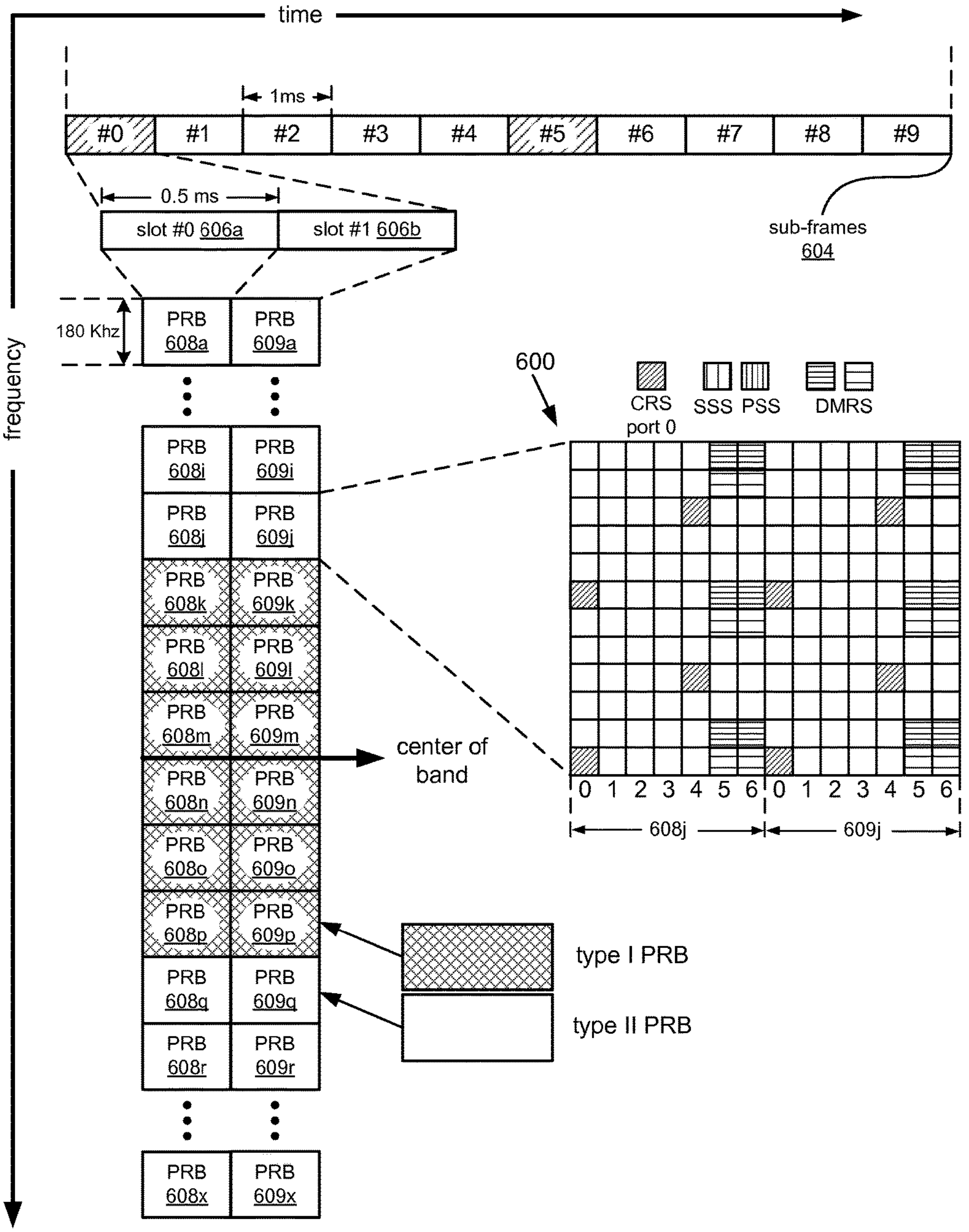
FIG. 6 is a block diagram illustrating PRBs for which PSS and/or SSS mapping can create collision potentials similar to those depicted in FIG. 2, FIG. 3A, and FIG. 3B, together with PRBs for which such collisions are not a concern for the NCT.

Unfortunately, the location of the PSS and the SSS, as defined in Release 8, can collide with the transmission of a DeModulation Reference Signal (DMRS) of certain sub-frames of a radio frame at the central 6 Physical Resource Blocks (PRBs) with respect to the central frequency of the Orthogonal Frequency Division Multiplexing (OFDM) bandwidth, as depicted in FIG. 6 below. The DMRS, which is embedded in the Physical Uplink Control CHannel (PUCCH) and Physical Uplink Shared CHannel (PUSCH) transmissions, provide the phase reference used in the demodulation of the data for these channels. Additional implementation details for a DMRS sequence can be found in 3GPP LTE Release 10 TS 36.211, Section 6.11.1.

Collisions with DMRS are not the only considerations important to the successful incorporation of the PSS and/or the SSS within the NCT for a Component Carrier (CC). Discoveries are shared herein about guidelines that can be used to inform the incorporation of the PSS and/or the SSS in the NCT. Also, different potential collisions with other signals used to inform the incorporation of the PSS and/or the SSS are uncovered. In some examples, incorporating the PSS and/or the SSS can be accomplished through the positioning of the PSS and/or the SSS based on the guidelines and potential collisions uncovered herein. In other examples, other signals, such as a DeModulation Reference Signal (DMRS), are reconfigured to allow incorporation of the PSS and the SSS, based on the guidelines and potential collisions uncovered herein. Furthermore, different accommodations are discussed with respect to Frequency Division Duplex (FDD) mode transmissions as opposed to Time Division Duplex (TDD) mode transmissions.

FIG. 1 depicts constitutive elements, with respect to time and frequency, of the Orthogonal Frequency Division Multiplexing (OFDM) transmission scheme employed by the Third Generation Partnership Project (3GPP) Long Term Evolution (LTE) standards. However, other OFDM and non-OFDM modulation schemes are possible. With respect to time in the example, a single radio frame 102, with a duration of 10 ms, is depicted from a stream of frames. The single radio frame comprises a set of 10 sub-frames 104, numbered from #1 to #10 in the expanded cutout of the radio frame. Each sub-frame has a duration of 1 ms. A sub-frame can be further subdivided into two slots (#0 106*a*, #1 106*b*), a slot having a duration of 0.5 ms.

The 0.5 ms duration of a slot can coincide with the temporal duration of a PRB 108*a-x*. A PRB, as further defined in 3GPP TS 36.211, Sections 5.2.3 and 6.2.3, can be the smallest unit of resource allocation assigned by a transmission point scheduler unit within 3GPP LTE standards. Other standards can define analogous units, for purposes of resource assignment, with respect to time and frequency.

In addition to its 0.5 ms temporal span, a PRB also spans a range of frequencies. Individual PRBs have distinct frequency spans, as depicted by the ascending series of PRBs with respect to frequency in FIG. 1. More specifically, an individual PRB 108*a-x* can include 12 different 15 kHz subcarriers 110 (on the frequency axis) and 6 or 7 time symbols 112 (on the time axis) per slot 106, per subcarrier, depending on whether a normal Cyclic Prefix (CP), 7 time symbols, or an extended CP, 6 time symbols, is used. The various subcarriers and time symbols with respect to frequency and time dimensions can create a grid of 84 Resource Elements (REs) 114, where a PRB 108*k* comprises 7 time symbols.

Figure 2:
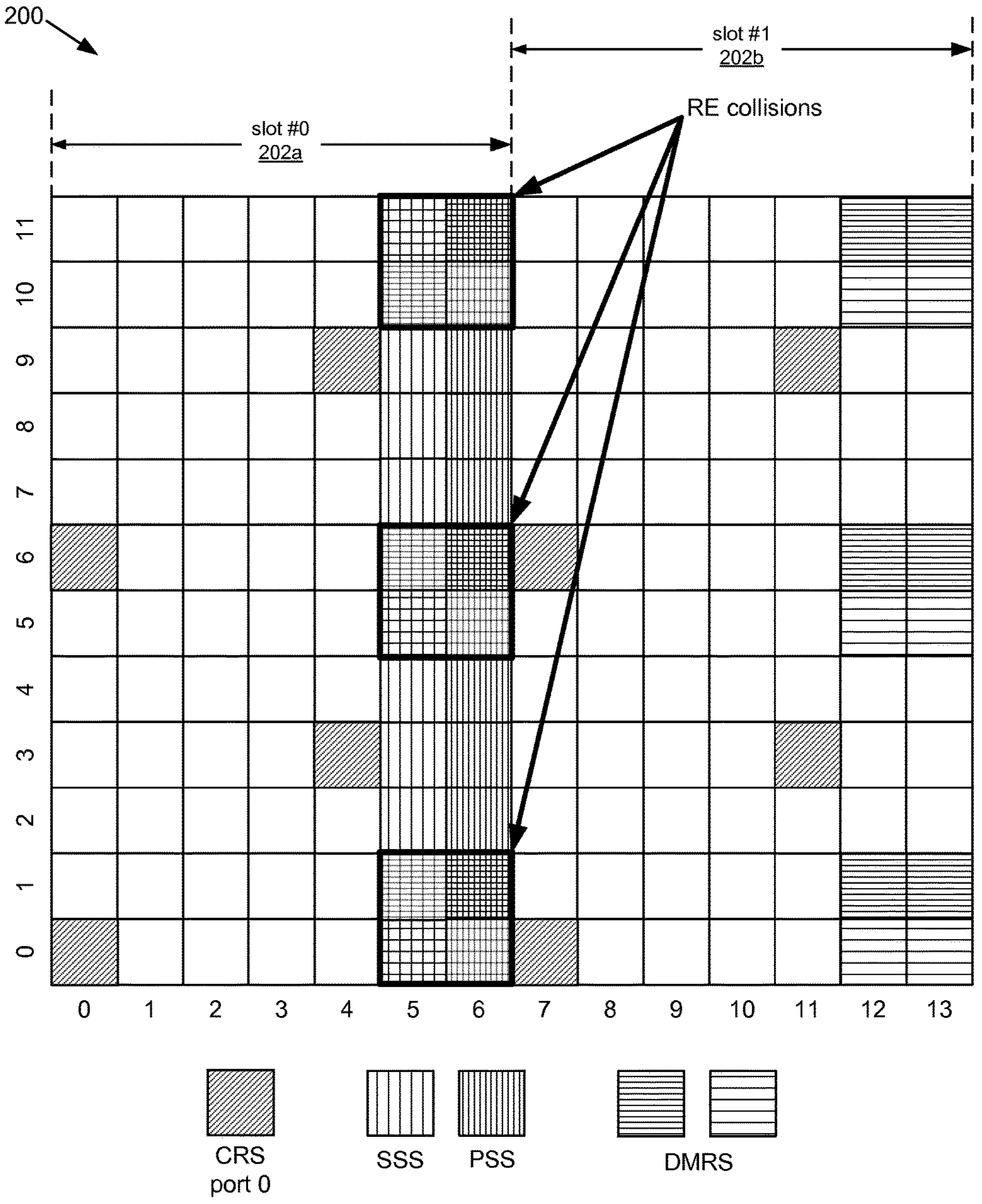
FIG. 2 is a block diagram illustrating collisions between a Primary Synchronization Signal (PSS) and a Secondary Synchronization Signal (SSS) and a DeModulation Reference Signal (DMRS) in sub-frames of certain Physical Resource Blocks (PRBs) of the (NCT) for Frequency Division Duplex (FDD) mode transmission.

FIG. 2 depicts collisions involving the Release 8 PSS and the Release 8 SSS with the Release 10 DMRS, for Frequency Division Duplex (FDD) mode transmission. FIG. 2 depicts a first slot, slot #0 202*a*, and a second slot, slot #1 202*b*, each pertaining to a PRB within a common sub-frame 200, employing a normal CP. The two PRBs can be within the central 6 PRBs discussed with respect to FIG. 6. The twelve rows, 0-11, make up the 12 sub-carriers of the two PRBs. Since a normal CP is employed, there are 14 columns, or 7 columns for each slot, representing 14 time symbols. The sub-frame is configured for FDD mode transmission and can correspond to either sub-frame #0 or sub-frame #5 of a radio frame in a 3GPP LTE Orthogonal Frequency-Division Multiple Access (OFDMA) frame.

For FDD transmission, Release 8 PSS and SSS sequences are mapped onto the ultimate and penultimate time symbols, time symbols 5 and 6, in the first slot, slot #0 202*a*, of sub-frame #0 and sub-frame #5 of a radio frame, for the central 6 PRBs of the system bandwidth. REs occupied by the PSS are indicated by the relatively narrow vertical hatching; REs occupied by the SSS are indicated by the relatively broad vertical hatching. REs occupied by the DMRS of Release 10 on antenna ports 7 through 14 are indicated by the relatively narrow and relatively broad horizontal hatching. The DMRS is mapped to time symbol 5 and time symbol 6, together with time symbol 12 and time symbol 13 for sub-carriers 0, 1, 5, 6, 10, and 11.

Unfortunately, therefore, the SSS in time symbol 5 and the PSS in time symbol 6 collide with the DMRS in these same time symbols. Since the PSS and SSS are indicated by vertical hatching and the DMRS is indicated by the horizontal hatching, the regions of collision are indicated by gridded hatching with line spacings that are relatively broad or narrow depending on the particular PSS, SSS, and DMRS REs involved in the collisions. The three regions of RE collision, each involving 4 REs, are outlined and indicated with arrows. Also depicted are REs occupied by Common Reference Signals (CRS), indicated by the cross-hatching.

The positioning of the CRSs in FIG. 2 are depicted in the positions occupied for sub-frame #0 and sub-frame #5 for antenna port 0. An antenna port can comprise one or more physical antennas used to add a spatial dimension to the time and frequency dimensions of LTE transmissions. Reference Signals (RSs), such as the CRSs can be used by a UE to estimate the radio channel associated with the given spatial characteristics for transmissions from a given antenna port. Although not depicted, Release 8 DMRS using transmit antenna port 5 also collides with Release 8 PSS for FDD mode transmission. As a result of such collisions, Release 10 DMRS cannot be transmitted in the central 6 PRBs for sub-frames carrying PSS and/or SSS. Furthermore, collision problems are not restricted to FDD transmission mode.

Figure 3B:
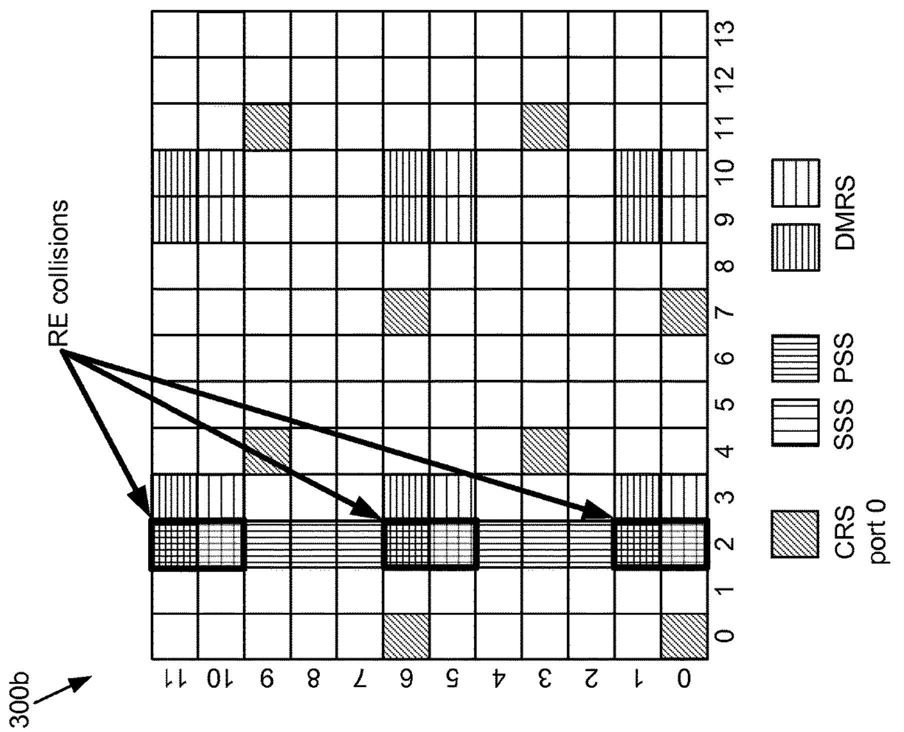
FIG. 3B is a block diagram illustrating collisions between a PSS and a DMRS in sub-frame #1 and sub-frame #6 of certain PRBs of the NCT for TDD mode transmission.
Figure 3A:
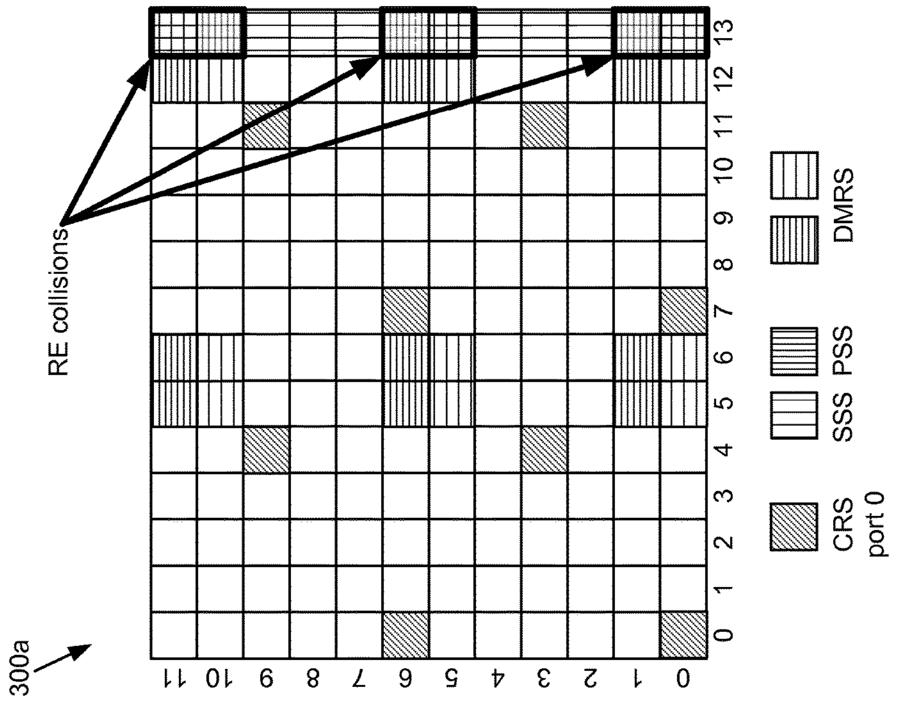
FIG. 3A is a block diagram illustrating collisions between an SSS and a DMRS in sub-frame #0 and sub-frame #5 of certain PRBs of the NCT for Time Division Duplex (TDD) mode transmission.

FIG. 3A depicts collisions between the SSS and the DMRS, for Release 8 for Time Division Duplex (TDD) mode transmission. As with FIG. 2, FIG. 3A also depicts two PRBs within a common sub-frame 300*a*, employing a normal CP, where the sub-frame corresponds to one of sub-frame #0 and sub-frame #5 of a radio frame and the two PRBs come from the central 6 PRBs with respect to system bandwidth. The PSS, the SSS, the CRS, and the DMRS are also all indicated by the same hatching patterns as in FIG. 2. However, the sub-frame of FIG. 3A is configured for TDD, not FDD, mode transmission.

The DMRS and CRS occupy the same REs as they do in FIG. 2. However, no PSS is mapped to the sub-frame 300*a*, only SSS. Also, the SSS is moved from time symbol 5 to the ultimate time symbol of the second slot, namely, time symbol 13. Unfortunately, the mapping of the SSS to time symbol 13 results in collisions with the REs of the DMRS, which, again, are indicated by REs with gridded hatching that are outlined and pointed to with arrows.

FIG. 3B depicts collisions between the PSS and the DMRS, for Release 8 PSS for TDD mode transmission. As with FIG. 3A, FIG. 3B also depicts two PRBs within a common sub-frame 300*b* configured for TDD mode transmission, employing a normal CP, where the two PRBs come from the central 6 PRBs with respect to system bandwidth. However, the sub-frame in FIG. 3B corresponds to one of sub-frame #1 and sub-frame #6 of a radio frame. Again, the PSS, the SSS, the CRS, and the DMRS are all indicated by the same hatching patterns as in FIG. 2 and FIG. 3A.

Although the CRS occupies the same REs, the DMRS occupies different REs located in time symbol 2 and time symbol 3 and in time symbol 9 and time symbol 10 for sub-carriers 0, 1, 5, 6, 10, and 11 for special sub-frame configuration 3, 4, 8 or 9. However, for special sub-frame configuration 1, 2, 6 or 7 (not shown in FIG. 3B), the DMRS occupies REs located in time symbol 2, time symbol 3, time symbol 5, and time symbol 6. Unfortunately, although the position of the PSS is changed, again the mapping of the PSS to time symbol 13 results in collisions with the REs of the DMRS, which, again, are indicated by REs that have gridded hatching and that are outlined and pointed to with arrows. Therefore, Release 10 DMRS also cannot be transmitted in the central 6 PRBs for sub-frames carrying PSS and/or SSS for TDD transmission mode.

In situations such as those depicted for Release 8, Release 9, and Release 10, when transmission of DMRS would potentially collide with the PSS and/or the SSS, the DMRS can be omitted. In such cases, for CCs, other than a NCT, CRS can be used instead of DMRS for data demodulation in the center 6 PRBs.

WG 1 of the TSG for the RAN has decided that, with respect to transmission of the CRS, in the NCT, the NCT can only carry one Reference Signal (RS) port, consisting of the Release 8 CRS on antenna port 0 within 1 sub-frame with 5 ms periodicity. Unfortunately, WG 1 of the TSG for the RAN also decided that RSs on antenna port 0 cannot be used for demodulation purposes with respect to the NCT. Based on this decision, therefore, CRS cannot be used for data demodulation purposes. Furthermore, as a result of this decision, the NCT is left to rely on DMRS based transmission schemes for data demodulation.

Therefore, in NCT design, the DMRS can be combined with the PSS and/or the SSS in the central 6 PRBs to allow for data demodulation at a receiving UE. Several potential solutions to avoid conflicts that would otherwise occur between the DMRS and the PSS and/or the SSS are discussed below. These solutions are applicable to the NCT for both FDD transmission mode and TDD transmission mode.

To resolve collisions between The DMRS and the PSS and/or the SSS, several examples can involve the assignment of the PSS and/or the SSS in a new time-symbol location(s) for the NCT. Additionally, several examples can involve the assignment of the DMRS to new REs, or removal from REs, in the new NCT. Many of the details for both kinds of assignments are discussed below.

The assignment of the PSS and/or the SSS in new time-symbol location(s) for the NCT are discussed first. Several considerations, or design guidelines, can be identified to inform the mapping, assignment, scheduling, or placement of the PSS and/or the SSS in the NCT. A list of these guidelines follows below.

Positioning in the Last Time Symbol:

If either of the PSS or the SSS are positioned in the last time symbol of a slot or of a sub-frame, timing can be determined from the PSS/SSS directly without knowledge of the CP length. The slot/sub-frame timing can be determined even if the PSS and/or the SSS are not located at the boundary of a slot/sub-frame. For example the timing can be determined from the distance between the PSS and the SSS. However, the determination in such situations where the PSS and/or the SSS are not located at a boundary relies on an assumption of the CP length, as arrived at by hypothesis testing. However, in this method, the accuracy of the sub-frame timing depends on the accuracy of the CP length detection algorithm applied. It is, therefore, preferable to place the PSS and/or the SSS in the last slot/sub-frame.

Relative Positioning of the PSS and/or the SSS:

The relative positioning of the PSS and the SSS is another significant guideline for assigning the time symbol of the PSS and the SSS. For FDD transmission mode for Release 8, as discussed above with respect to FIG. 2, the SSS is located in the time symbol, i.e., time symbol 5, immediately preceding the PSS, in time symbol 6. However, for the TDD transmission mode, as discussed above, with respect to FIG. 3A and FIG. 3B, the SSS is located in a time symbol in a sub-frame different from the sub-frame in which the PSS is located, namely the proceeding sub-frame.

Such close proximity of the PSS and the SSS in time enables the coherent detection of the SSS relative to the PSS. Coherent detection is based on the assumption that the channel coherence duration is significantly longer than the time between the PSS and the SSS. To take advantage of the coherent detection for the SSS, in NCT design, it can be desired to keep the PSS and the SSS signaling locations close together.

Preventing Legacy UEs from Acquiring the PSS and/or the SSS from the NCT:

By changing the relative time location of the PSS and the SSS compared to the time symbols in which they are located in Release 8, the acquisition of the PSS and/or the SSS by the legacy UEs can be prevented. Alternative approaches to preventing legacy UEs from acquiring the PSS and/or the SSS of the NCT are also possible. However, complexity is reduced, in terms of further changes in the specifications, where new placements of the PSS and/or the SSS in the NCT already prevent legacy UEs from acquiring the PSS and/or the SSS of the NCT.

For the FDD transmission mode, since the PSS is mapped in the time symbol following the time symbol of the SSS, as shown in FIG. 2, one way to achieve such a change in time symbol location for the PSS is to avoid mapping the PSS in a time symbol subsequent to that of the SSS. Similarly, for the TDD transmission mode, the goal can be achieved by changing the relative time locations of the SSS and the PSS from three time symbols to some other number of time symbols. In some examples, the same relative time locations can be maintained where the location of the SSS and the PSS are swapped.

Commonality Between FDD and TDD, Normal and Extended CP:

A common design for normal/extended CP will enable simpler detection of PSS/SSS schemes at a UE. During initial cell search, a UE may need to detect whether an eNodeB is using FDD or TDD from the PSS/SSS. Therefore, it may be desirable to have some mechanism to distinguish the PSS/SSS location in FDD from that in TDD mode transmissions.

Future Compatibility and Consideration for Stand-Alone NCT:

For Release 11 of the 3GPP LTE standards, the NCT has been designated as a non-stand-alone carrier. In other words, the NCT is always aggregated with another CC, known as the Primary Cell (PCell). In this case, the NCT is served as a Secondary Cell (SCell). However, in future releases of the 3GPP LTE standards, it is anticipated that a provision will be made for the NCT to also be a stand-alone carrier. In other words, the NCT can be a PCell and can be expected to provide all of the essential, and possibly many non-essential, services and functionalities of the 3GPP LTE standard. In order to avoid further issues related to PSS/SSS collision with other signaling that would be involved with stand-alone NCT, consideration can be given to accommodate such signaling. For example, accommodation can be made for Physical Broadcast CHannel (PBCH) signaling, enhanced Physical Downlink Control CHannel signaling (ePDCCH), and Multimedia Broadcast Single Frequency Network (MBSFN) transmission, among other possibilities.

Collision Avoidance with Existing RSs and Other Signaling:

Although consideration has already been made for collisions with DMRS, other forms of signaling can also present the potential for collision. If the time-symbol location of the PSS and the SSS is changed from the Release 8 design, new collision possibilities with other signals may arise. Table 1, Table 2, and Table 3, below, provide a comprehensive list of signaling positions in Release 10 for FDD/TDD normal CP cases, FDD/TDD extended CP cases, and the TDD special sub-frame case respectively.

TABLE 1

Time location of signal for sub-frames #0 and #5 (normal CP).

| Time-Symbol Position | FDD (SF 0 or SF 5) | TDD (SF 0 or SF 5) |
|---|---|---|
| Slot #0 | | |
| 0 | CRS port 0<br>PDCCH region | CRS port 0<br>PDCCH region |
| 1 | PDCCH region | PDCCH region |
| 2 | PDCCH region | PDCCH region |
| 3 | DMRS port 5<br>PRS | DMRS port 5<br>PRS |
| 4 | CRS port 0 | CRS port 0 |
| 5<br>(Rel-8 FDD SSS position) | DMRS port {7, . . . , 14}<br>CSI-RS<br>PRS | DMRS port {7, . . . , 14}<br>CSI-RS<br>PRS |
| 6<br>(Rel-8 FDD PSS position) | DMRS port 5<br>DMRS port {7, . . . , 14}<br>CSI-RS<br>PRS | DMRS port 5<br>DMRS port {7, . . . , 14}<br>CSI-RS<br>PRS |
| Slot #1 | | |
| 0 | CRS port 0<br>PBCH (only SF 0) | CRS port 0<br>PBCH (only SF 0) |
| 1 | PBCH (only SF 0)<br>PRS | PBCH (only SF 0)<br>PRS<br>CSI-RS |
| 2 | DMRS port 5<br>PBCH (only SF 0)<br>CSI-RS<br>PRS | DMRS port 5<br>PBCH (only SF 0)<br>CSI-RS<br>PRS |
| 3 | PBCH (only SF 0)<br>CSI-RS<br>PRS | PBCH (only SF 0)<br>CSI-RS<br>PRS |
| 4 | CRS port 0 | CRS port 0 |

TABLE 1-continued

Time location of signal for sub-frames #0 and #5 (normal CP).

| Time-Symbol Position | FDD (SF 0 or SF 5) | TDD (SF 0 or SF 5) |
|---|---|---|
| 5 | DMRS port 5<br>DMRS port {7, . . . , 14}<br>CSI-RS<br>PRS | DMRS port 5<br>DMRS port {7, . . . , 14}<br>CSI-RS<br>PRS |
| 6<br>(Rel-8 TDD SSS position) | DMRS port {7, . . . , 14}<br>CSI-RS<br>PRS | DMRS port {7, . . . , 14}<br>CSI-RS<br>PRS |

TABLE 2

Time location of signal for sub-frames #0 and #5 (extended CP).

| Time-Symbol Position | FDD (SF 0 or SF 5) | TDD (SF 0 or SF 5) |
|---|---|---|
| | Slot #0 | |
| 0 | CRS port 0<br>PDCCH region | CRS port 0<br>PDCCH region |
| 1 | PDCCH region | PDCCH region |
| 2 | PDCCH region | PDCCH region |
| 3 | CRS port 0 | CRS port 0 |
| 4<br>(Rel-8 FDD SSS position) | DMRS port 5<br>DMRS port {7, . . . , 14}<br>CSI-RS<br>PRS | DMRS port 5<br>DMRS port {7, . . . , 14}<br>CSI-RS<br>PRS |
| 5<br>(Rel-8 FDD PSS position) | DMRS port {7, . . . , 14}<br>CSI-RS<br>PRS | DMRS port {7, . . . , 14}<br>CSI-RS<br>PRS |
| | Slot #1 | |
| 0 | CRS port 0<br>PBCH (only SF 0) | CRS port 0<br>PBCH (only SF 0) |
| 1 | DMRS port 5<br>PBCH (only SF 0)<br>PRS | DMRS port 5<br>PBCH (only SF 0)<br>CSI-RS<br>PRS |
| 2 | PBCH (only SF 0)<br>PRS | PBCH (only SF 0)<br>PRS<br>CSI-RS |
| 3 | PBCH (only SF 0)<br>CRS port 0 | PBCH (only SF 0)<br>CRS port 0 |
| 4 | DMRS port 5<br>DMRS port {7, . . . , 14}<br>CSI-RS<br>PRS | DMRS port 5<br>DMRS port {7, . . . , 14}<br>CSI-RS<br>PRS |
| 5<br>(Rel-8 TDD SSS position) | DMRS port {7, . . . , 14}<br>CSI-RS<br>PRS | DMRS port {7, . . . , 14}<br>CSI-RS<br>PRS |

TABLE 3

Time location of signal for TDD for sub-frames #1 and #6 SF1 and SF6 (normal/extended CP).

| Time-Symbol Position | Normal CP | Extended CP |
|---|---|---|
| | Slot #0 | |
| 0 | CRS port 0<br>PDCCH region | CRS port 0<br>PDCCH region |
| 1 | PDCCH region | PDCCH region |
| 2<br>(Rel-8 TDD PSS position) | PSS<br>DMRS port {7, . . . , 14}<br>(for SF configuration 1, 2, 3, 4, 5, 7, 8) | PSS |

Other symbols in the sub-frame may be either UpLink (UL) or DownLink (DL) or Guard Period (GP) based on the special sub-frame configuration. Therefore, these positions should not be considered for the PSS location in NCT.

Based on the foregoing Table 1, Table 2, and Table 3, and the locations of other signals set forth therein, consideration can be made to avoid collisions between the PSS and/or the SSS with other signals for NCT. Possible collisions, consequences, and solutions to avoid those collisions are, therefore, listed and described below:

Conflict with CRS Signaling:

If the PSS and the SSS are transmitted at the beginning of a sub-frame (e.g. time symbol 0), then the rest of the time symbols can be used for data transmission. Such a configuration may have multiple benefits. For example, this configuration will enable the transmission of Physical Downlink Shared CHannel (PDSCH) symbols in locations close to DMRS REs. By placing DMRS in REs close to PDSCH symbols with respect to time and/or frequency, better channel estimates can be made for PDSCH symbols and demodulation performance can be improved. In addition, this will enable segmentation free data transmission. Also, since the PSS and/or the SSS are transmitted at a sub-frame boundary, detection of the PSS and/or the SSS can be easier. However, the first symbol in sub-frame #0 and sub-frame #5 are occupied by CRS, as depicted in FIG. 2, FIG. 3A, and FIG. 3B.

Nevertheless, two approaches for avoiding potential collisions are provided herein. According to a first approach: a CRS sub-frame offset can be applied whereby the transmission of the CRS can be moved from sub-frame #0 and sub-frame #5 to other sub-frame locations. According to a second approach: the transmission of the PSS and/or the SSS can be moved, instead of the CRS, from sub-frame #0 and sub-frame #5 to other sub-frame locations. For example, instead of transmitting in sub-frame #0 and sub-frame #5, the PSS and/or the SSS can be transmitted in sub-frame #1 and sub-frame #6 or sub-frame #2 and sub-frame #7 and similar other possible combinations.

Conflict with Channel State Information-Reference Signal (CSI-RS):

Fortunately, CSI-RS scheduling is flexible. For example, offset, periodicity and transmission sub-frame for CSI-RS signaling are extensively configurable. Therefore, in case the new time locations of the PSS and the SSS create one or more collisions with CSI-RS, then CSI-RS placement can be moved. However, if possible, it is preferable to place the PSS and/or the SSS in a time location that will avoid such collisions.

Conflict with the DMRS Using Antenna Port 5:

The transmission of the PSS for the FDD mode transmission collides with the transmission of the DMRS on antenna port 5. Although, initially intended for TDD operation, transmission using antenna port 5 is also possible for FDD mode. Both for TDD and FDD mode transmissions, a single antenna port transmission is possible using antenna port 7 or 8, which are similar to the antenna port 5 based transmission mode 7. Therefore, there is no good motivation in keeping transmission mode 7 for NCT. Whether transmission mode 7 will be used or not is network implementation dependent, and therefore, the decision should be made by the operator. From a design point of view, it is preferable to avoid such collision if possible.

Conflict with the DMRS Using any Combination of Antenna Ports 7 Through 14:

DMRS signals using antenna ports 7 through 14 are transmitted in the last two symbols of both slot #0 and slot #1 in a sub-frame. Therefore, in order to avoid collisions with DMRS, scheduling of the PSS and/or of the SSS in the last two time symbols of each slot should be avoided. Additionally, for the special sub-frame of the TDD transmission mode, the DMRS using some combination of antenna ports 7 through 14 can be transmitted in time symbol 2 and time symbol 3 for normal CP case. Therefore, transmission of the PSS and the SSS can be avoided in these signals.

Conflict with Positioning Reference Signals (PRSs):

According to 3GPP TS 36.211, PRSs are not to be mapped to REs allocated to the PBCH, the PSS, or the SSS, regardless of their antenna port. Therefore, the transmission of the PSS and/or the SSS in new time symbol locations does not create any additional conflict in this respect. However, further enhancement in performance compared to Release 8 is possible by avoiding the positions of PRS transmissions while mapping the PSS/SSS in the NCT.

Conflict with PBCH Transmission:

Where the NCT operates as a non-stand-alone, PBCH transmission is not necessary. However, in future LTE releases, if NCT is extended to operate as a stand-alone carrier, transmission of PBCH may be necessary. In such cases, transmission of the PSS and/or the SSS in new time symbols can create potential new conflicts with the transmission of PBCH signals. Therefore, in such cases, the PSS and/or the SSS can be scheduled to avoid such conflicts.

Conflict with PDCCH/ePDCCH Region:

Since CRSs in the NCT will not be used for demodulation purposes, transmission of the PDCCH is not possible. Therefore, a control channel transmitted in the NCT relies on DMRS based ePDCCH. The possible collision between ePDCCH and the PSS and/or the SSS should also be avoided in configuring new locations for the PSS and/or the SSS.

Conflict with MBSFN Sub-Frames:

Since the Release 8 PSS and the Release 8 SSS are transmitted in a non-MBSFN sub-frame, no potential conflict between the PSS and the SSS and MBSFN transmission can occur. However, in the NCT design, if the PSS and/or the SSS locations are changed to an MBSFN sub-frame, proper consideration should be given to avoid any potential conflict.

Based on the above discussions, design guidelines, and/or collision potentials, the following possible PSS and/or SSS time symbol locations for the NCT are provided in Table 4(a) for FDD mode transmission with normal CP. Table 4(b) provides PSS and/or SSS time symbol locations for FDD mode transmission with extended CP. With respect to TDD mode transmissions, Table 5(a) provides PSS and/or SSS time symbol locations for normal CP. Table 5(b) provides PSS and/or SSS time symbol locations for extended CP.

Each table provides the sub-frame number, the slot number, and the time symbol location for the PSS and the SSS for each option. Additionally, comments are provided for each option about how the positioning of the PSS and the SSS relates to the various guidelines, considerations, and collision scenarios discussed above. The comments also discuss the advantages and drawbacks of each option. Also, as discussed below, the time symbol positions of the PSS and the SSS can be swapped.

TABLE 24(a)

TABLE 24(a)-continued

FDD normal CP.

| Option | PSS (SSS) Location | SSS (PSS) Location | Comments |
|---|---|---|---|
| 1 | SF0, 5 Slot0 Sym1 | SF0, 5 Slot0 Sym2 | No collision<br>Sub-frame timing cannot be readily achieved from PSS. |
| 2 | SF0, 5 Slot0 Sym2 | SF0, 5 Slot0 Sym3 | TM7 transmission will not be possible. |
| 3 | SF0, 5 Slot1 Sym1 | SF0, 5 Slot1 Sym2 | Possible collision with CSI-RS and PRB.<br>Possible collision with PBCH (may be needed for future stand-alone NCT) |
| 4 | SF0, 5 Slot1 Sym2 | SF0, 5 Slot1 Sym3 | Possible collision with CSI-RS and PRB.<br>Possible collision with PBCH (may be needed for future stand-alone NCT) |
| 5 | SF4, 9 Slot0 Sym0 | SF4, 9 Slot0 Sym1 | No collision<br>Frame boundary detection may be less accurate than Rel-8 design. |
| 6 | SF4, 9 Slot0 Sym0 | SF4, 0 Slot1 Sym0 | No collision.<br>SSS timing detection from PSS will not require CP length information.<br>Coherent detection of SSS with respect to PSS may be erroneous.<br>CP length detection may not be possible from relative distance between PSS and SSS. |
| 7 | SF4, 9 Slot1 Sym0 | SF4, 9 Slot1 Sym4 | No collision.<br>Coherent detection of SSS with respect to PSS will be less accurate than Rel-8 design. |

TABLE 4(b)

FDD extended CP.

| Option | PSS (SSS) Location | SSS (PSS) Location | Comments |
|---|---|---|---|
| 1 | SF0, 5 Slot0 Sym1 | SF0, 5 Slot0 Sym2 | No collision<br>Sub-frame timing cannot be readily achieved from PSS. |
| 2 | SF0, 5 Slot1 Sym1 | SF0, 5 Slot1 Sym2 | TM7 transmission will not be possible.<br>Possible collision with CSI-RS and PRB. |
| 3 | SF4, 9 Slot0 Sym0 | SF4, 9 Slot0 Sym1 | No collision<br>Frame boundary detection may be less accurate than Rel-8 design. |
| 4 | SF4, 9 Slot0 Sym0 | SF4, 9 Slot1 Sym0 | No collision.<br>SSS timing detection from PSS will not require CP length information.<br>Coherent detection of SSS with respect to PSS may be erroneous.<br>CP length detection may not be possible from relative distance between PSS and SSS. |
| 5 | SF4, 9 Slot1 Sym0 | SF4, 9 Slot1 Sym3 | No collision.<br>Coherent detection of SSS with respect to PSS will be less accurate than Rel-8 design. |

TABLE 3(a)

TDD normal CP.

| Option | PSS (SSS) Location | SSS (PSS) Location | Comments |
|---|---|---|---|
| 1 | SF1, 6 Slot0 Sym0 | SF0, 5 Slot0 Sym1 | No collision.<br>Coherent detection of SSS with respect to PSS may be erroneous. |
| 2 | SF1, 6 Slot0 Sym0 | SF0, 5 Slot0 Sym2 | No collision.<br>Coherent detection of SSS with respect to PSS may be erroneous. |

TABLE 3(a)-continued

| TDD normal CP. | | | |
|---|---|---|---|
| Option | PSS (SSS) Location | SSS (PSS) Location | Comments |
| 3 | SF1, 6 Slot0 Sym1 | SF0, 5 Slot0 Sym1 | No collision. Coherent detection of SSS with respect to PSS may be erroneous. SSS timing detection from PSS will not require CP length information. CP length detection may not be possible from relative distance between PSS and SSS. |
| 4 | SF1, 6 Slot0 Sym1 | SF0, 5 Slot0 Sym2 | No collision. Coherent detection of SSS with respect to PSS may be erroneous. |
| 5 | SF 0, 5 Slot0 Sym1 | SF 0, 5 Slot0 Sym2 | No collision. Sub-frame timing cannot be readily achieved from PSS. Relative distance between PSS and SSS is same as Rel-8 FDD. TDD/FDD system detection may be problematic. |
| 6 | SF 0, 5 Slot1 Sym1 | SF 0, 5 Slot1 Sym3 | TM7 transmission will not be possible. |
| 7 | SF 1, 6 Slot1 Sym0 | SF 1, 6 Slot1 Sym1 | No collision. Sub-frame timing cannot be readily achieved from PSS. Relative distance between PSS and SSS is same as Rel-8 FDD. TDD/FDD system detection may be problematic. |

TABLE 5(b)

| TDD extended CP. | | | |
|---|---|---|---|
| Option | PSS (SSS) Location | SSS (PSS) Location | Comments |
| 1 | SF1, 6 Slot0 Sym0 | SF0, 5 Slot0 Sym1 | No collision. Coherent detection of SSS with respect to PSS may be erroneous. |
| 2 | SF1, 6 Slot0 Sym0 | SF0, 5 Slot0 Sym2 | No collision. Coherent detection of SSS with respect to PSS may be erroneous. |
| 3 | SF1, 6 Slot0 Sym1 | SF0, 5 Slot0 Sym1 | No collision. Coherent detection of SSS with respect to PSS may be erroneous. SSS timing detection from PSS will not require CP length information. CP length detection may not be possible from relative distance between PSS and SSS. |
| 4 | SF1, 6 Slot0 Sym1 | SF0, 5 Slot0 Sym2 | No collision. Coherent detection of SSS with respect to PSS may be erroneous. |
| 5 | SF1, 6 Slot0 Sym2 | SF0, 5 Slot0 Sym1 | No collision. Coherent detection of SSS with respect to PSS may be erroneous. PSS is located in the same location as Rel-8. |
| 6 | SF1, 6 Slot0 Sym2 | SF0, 5 Slot0 Sym2 | No collision. Coherent detection of SSS with respect to PSS may be erroneous. SSS timing detection from PSS will not require CP length information. CP length detection may not be possible from relative distance between PSS and SSS. PSS is located in the same location as Rel-8. |
| 7 | SF1, 6 Slot0 Sym2 | SF1, 6 Slot0 Sym0 | No collision. Sub-frame timing cannot be readily achieved from PSS. |

TABLE 5(b)-continued

| TDD extended CP. | | | |
|---|---|---|---|
| Option | PSS (SSS) Location | SSS (PSS) Location | Comments |
| 8 | SF1, 6 Slot0 Sym2 | SF1, 6 Slot0 Sym1 | No collision. Sub-frame timing cannot be readily achieved from PSS. Relative distance between PSS and SSS is same as Rel-8 FDD. TDD/FDD system detection may be problematic. |
| 9 | SF1, 6 Slot0 Sym1 | SF1, 6 Slot0 Sym0 | No collision. Sub-frame timing cannot be readily achieved from PSS. Relative distance between PSS and SSS is same as Rel-8 FDD. TDD/FDD system detection may be problematic. |
| 10 | SF1, 5 Slot0 Sym1 | SF1, 5 Slot0 Sym2 | No collision. Sub-frame timing cannot be readily achieved from PSS. Relative distance between PSS and SSS is same as Rel-8 FDD. TDD/FDD system detection may be problematic. |

Based on Table 4a, Table 4b, Table 5a, and Table 5b, several different options present themselves. Based on these tables, the various guidelines, considerations, and collision scenarios, as also considered in the comments, the following two exemplary options are suitable and can be proposed for placement of the PSS and the SSS in the NCT.

Option 1:

The PSS and the SSS can be transmitted in the NCT in the second time symbol, time symbol 1, and the third time symbol, time symbol 2, of sub-frame #0 and sub-frame #5 for both FDD mode transmission and TDD mode transmission.

Figure 4A:
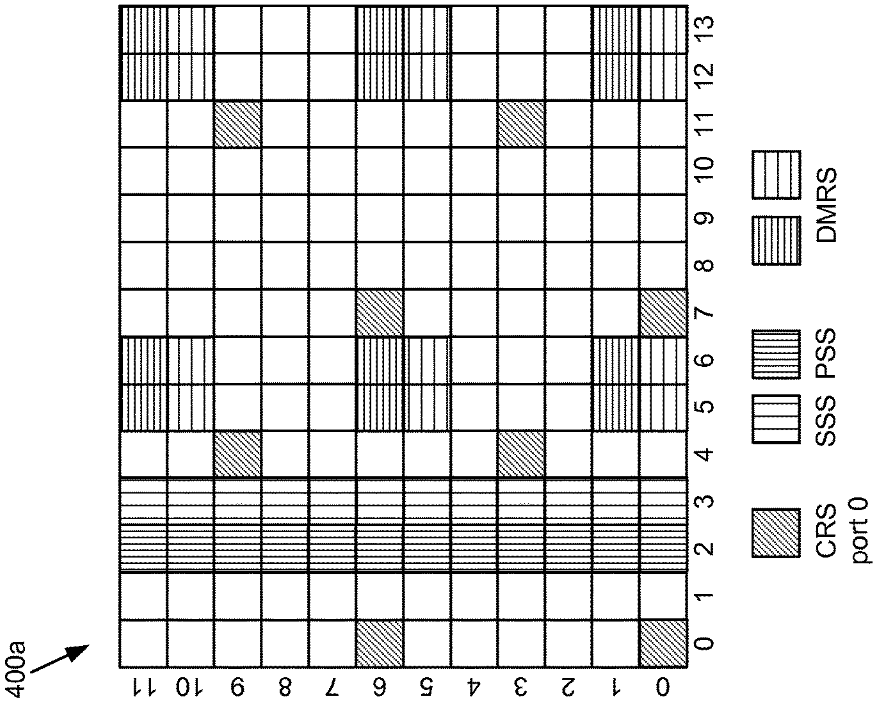
FIG. 4A is a block diagram illustrating the repositioning of the PSS and the SSS in sub-frame #0 and sub-frame #5 of certain PRBs of the NCT for FDD mode transmission, consistent with various examples.

FIG. 4A depicts option 1 with the repositioning of the PSS and the SSS in sub-frame #0 and sub-frame #5 of the NCT for FDD mode transmissions. As with FIG. 2, FIG. 4A also depicts two PRBs within a common sub-frame 400*a* configured for FDD mode transmission, employing a normal CP, where the two PRBs each come from the central 6 PRBs with respect to system bandwidth of the time slot to which they pertain. Also, the sub-frame in FIG. 4A corresponds to one of sub-frame #0 and sub-frame #5 of a radio frame. Again, the PSS, the SSS, the CRS, and the DMRS are also all indicated by the same hatching patterns as in FIG. 2.

Unlike FIG. 2, however, the location of the SSS and the PSS has been changed from time-symbol 5 for the SSS and time-symbol 6 for the PSS to time-symbol 1 for the PSS and time-symbol 2 for the SSS. As can be appreciated, there no longer are any collisions. Not only are there no longer any collisions but additional advantages, as discussed below, also obtain. However, before those advantages are addressed, depictions of option 1 for TDD mode transmissions, and of option 2 for both FDD mode transmissions and TDD mode transmissions are discussed.

Figure 4B:
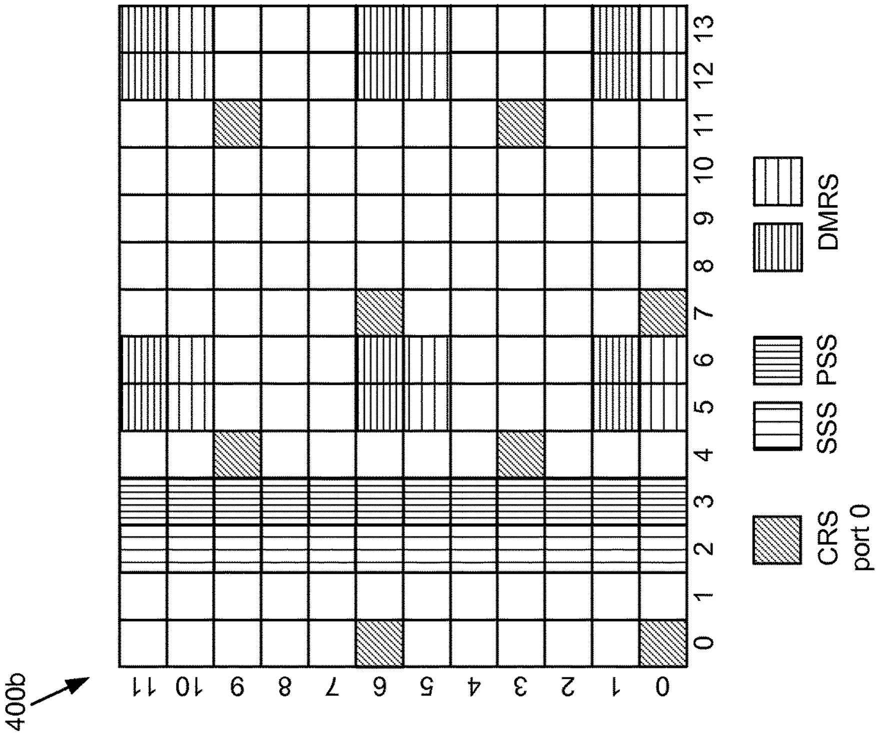
FIG. 4B is a block diagram illustrating the repositioning of the PSS and the SSS in sub-frame #0 and sub-frame #5 of certain PRBs of the NCT for TDD mode transmission, consistent with various examples.

FIG. 4B also depicts the repositioning of the PSS and the SSS in sub-frame #0 and sub-frame #5 of the NCT, but for TDD mode transmissions. FIG. 4B also depicts two PRBs within a common sub-frame 400*b* employing a normal CP and corresponding to one of sub-frame #0 and sub-frame #5 of a radio frame. Unlike FIG. 4A, however, in FIG. 4B, the SSS has been changed to time-symbol 1, instead of time symbol 2, and the PSS has been changed to time-symbol 2, instead of time symbol 1. Yet, there are also no longer are any collisions and additional advantages obtain.

Option 2:

The PSS and the SSS can be transmitted in the NCT in the first time symbol, time symbol 0, and the second time symbol, time symbol 1, of sub-frame 4 and sub-frame 9 for FDD mode transmissions. For TDD mode transmissions, the PSS and the SSS can be transmitted in the first time symbol, time symbol 0, and second time symbol, time symbol 1, of sub-frame #1 and sub-frame #6.

Figure 5B:
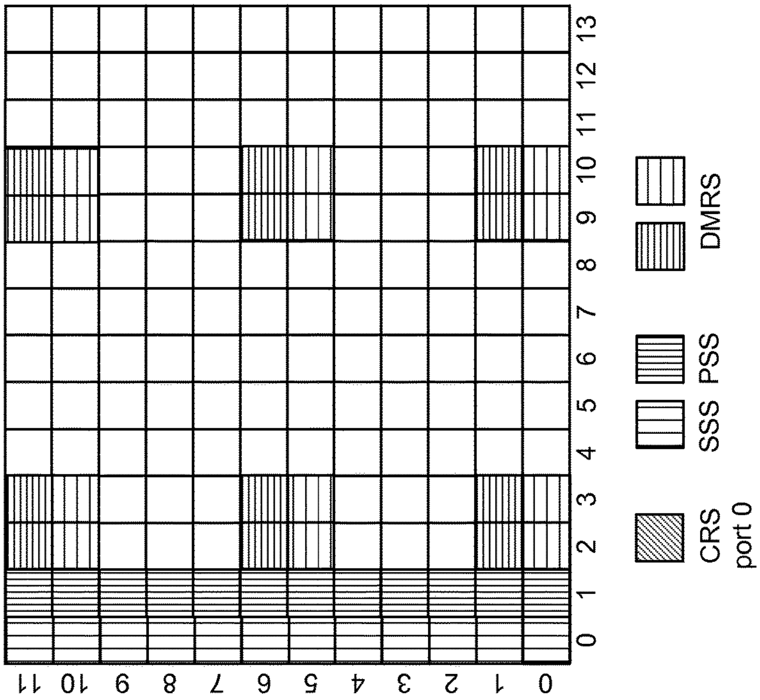
FIG. 5B is a block diagram illustrating the repositioning of the PSS and the SSS in sub-frame #1 and sub-frame #6 of certain PRBs of the NCT for TDD mode transmission, consistent with various examples.
Figure 5A:
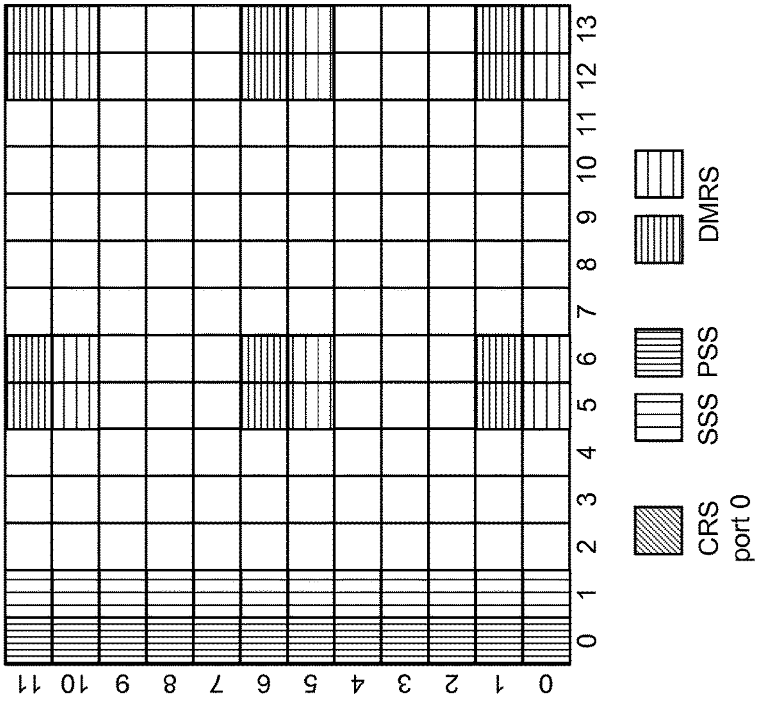
FIG. 5A is a block diagram illustrating the repositioning of the PSS and the SSS in sub-frame #4 and sub-frame #9 of certain PRBs of the NCT for FDD mode transmission, consistent with various examples.

FIG. 5A depicts option 2 and the placement of the PSS and the SSS in sub-frame #4 and sub-frame #9 of the NCT for FDD mode transmission. Again, two PRBs, each of which come from the central 6 PRBs with respect to system bandwidth of the time slot to which they pertain, are depicted for a normal CP. The REs occupied by the PSS, the SSS, and the DMRS are also all indicated by the common hatching patterns. The PSS occupies time symbol #0. The SSS occupies time symbol #1. As a result, there are no collisions, and additional advantages, discussed below, also obtain.

FIG. 5B also depicts option 2, but with respect to TDD mode transmission. Two adjacent PRBs, with respect to time, each coming from a set of 6 central PRBs, with respect to frequency, for a time slot to which each PRB pertains, are also depicted for a normal CP, but corresponding to sub-frame #1 and sub-frame #6. As can be appreciated, the REs occupied by the DMRS are different. Also, the SSS in FIG. 5B occupies time symbol 0, instead of time symbol 1. Similarly, in FIG. 5B, the PSS occupies time symbol 1, instead of time symbol 0. Nevertheless, collisions are avoided and additional advantages, common to both option 1 and option 2, obtain. Some of these advantages are discussed in the following paragraphs.

One of the particular advantages of both option 1 and option 2, as described above, is that they provide the most commonality between FDD and TDD mode transmissions and normal CP and extended CP based systems. Also, since the PSS and the SSS can be located in consecutive symbols in both option 1 and option 2, coherent detection of the SSS with respect to the PSS will be possible. However, for option 1, unlike the positions for PSS and SSS for Release 8, neither PSS nor SSS are located in a sub-frame/slot boundary.

Therefore, for the proposed options, sub-frame/slot timing estimation can be based on the relative timing between the PSS and the SSS and an assumption about the CP length. However, since the PSS and the SSS are located in non-MBSFN sub-frames, the CP length will be fixed for all the time symbols within the sub-frame. A drawback of both options is the detection of a FDD mode transmission as opposed to a TDD mode transmission and vice versa. To resolve this issue, where necessary, the position of the PSS and the SSS can be swapped in the FDD transmission mode as opposed to the TDD transmission mode. These options are listed in Table 6. Note that the reason for swapping the positions of the PSS and the SSS is to differentiate between the FDD mode transmissions and the TDD mode transmissions. The motivation for the approach depicted in Table 6 is different from the motivation where swapping positions is motivated by the objective of preventing the legacy devices from acquiring the PSS and/or the SSS of the new carrier type.

TABLE 4

| PSS/SSS scheme in NCT | | |
|---|---|---|
| | PSS | SSS |
| Scheme 1 (shown in FIG. 4A and FIG. 4B): | | |
| FDD | SF 0, 5 Slot #0 Sym1 | SF 0, 5 Slot #0 Sym2 |
| TDD | SF 0, 5 Slot #0 Sym2 | SF 0, 5 Slot #0 Sym1 |
| Scheme 2: | | |
| FDD | SF 0, 5 Slot #0 Sym2 | SF 0, 5 Slot #0 Sym1 |
| TDD | SF 0, 5 Slot #0 Sym1 | SF 0, 5 Slot #0 Sym2 |
| Scheme 3 (shown in FIG. 5A and FIG. 5B): | | |
| FDD | SF 4, 9 Slot #0 Sym 0 | SF 4, 9 Slot #0 Sym 1 |
| TDD | SF 1, 6 Slot #0 Sym 1 | SF 1, 6 Slot #0 Sym 2 |
| Scheme 4: | | |
| FDD | SF 4, 9 Slot #0 Sym 1 | SF 4, 9 Slot #0 Sym 0 |
| TDD | SF 1, 6 Slot #0 Sym 2 | SF 1, 6 Slot #0 Sym 1 |

FIG. 6 depicts PRBs for which the PSS and/or SSS placement can create collision potentials. Similar to FIG. 1, a sequence of 10 sub-frames 604, from a radio frame, are depicted with respect to time. Sub-frame #0 and sub-frame #5 are cross hatched diagonally because these sub-frames are designated in Release 8 to carry the PSS and the SSS. Two slots (slot #0 606*a*, slot #1 606*b*) are depicted for sub-frame #0 in expanded views.

A first column 608*a-x* of PRBs corresponding to slot #0 is depicted with respect to frequency. Also, a second column 609*a-x* of PRBs corresponding to slot #1 is depicted. The two columns are adjacent with respect to time. An expanded view 600 of a pair of PRBs 608*j*, 609*j* is also depicted, showing the REs occupied by CRS for antenna port 0 and the Release 10 DMRS for a combination of antenna ports 7 through 14. Since the pair of PRBs do not pertain to the central 6 PRBs with respect to frequency, PSS and SSS are not scheduled therein.

The PSS and the SSS are scheduled for type I PRBs 608*k*-608*p*, 609*k*-609*p*, or the PRBs for the central 6 PRBs with respect to the central frequency of the system bandwidth for a given slot. The type I PRBs, of the central 6 PRBs for each column/slot are indicated by the diamond cross hatching. The remaining PRBs 608*a*-608*j*, 608*q*-608*x*, 609*a*-609*j*, and 609*q*-609*x*, or type II PRBs, are not filled in. The PSS and/or the SSS are not assigned to these type II PRBs.

Since RE assignments to avoid collisions can result in performance degradation, in some examples, collision avoiding assignments can be made in type I PRBs, but not type II PRBs. However, different assignment regimes can result in increased complexity requirements for a receiving UE. Therefore, in some examples, collision avoiding assignments can be made in both type I and type II PRBs.

Now that the reassignment of the PSS and/or the SSS has been discussed, alternative examples involving the reassignment of The DMRS for the new NCT can be discussed. New designs of DMRS can be considered for the NCT. As with the PSS and/or the SSS, the new DMRS assignments can be used only in the type I PRBs where the collisions can occur, or they can be made in all the PRBs. Limiting assignments to type I PRBs can be desirable because the DMRS density in PRBs were reassignments are made can be lower than in Release 10 designs. Consequently, channel estimates can deteriorate in these PRBs.

However, deterioration of channel estimates can be compensated for by the eNodeB, which can choose to schedule slow moving UEs in these PRBs for which such deterioration is a possibility. Furthermore, applying the reassignments to all the PRBs can also be attractive since this can result in the least change in the specifications. Therefore, in some examples, the reassignments can be applied to all the PRBs. In the new DMRS assignments, DMRS REs can be eliminated from the time-symbol positions where collision with the PSS and/or the SSS can occur.

Figure 7:
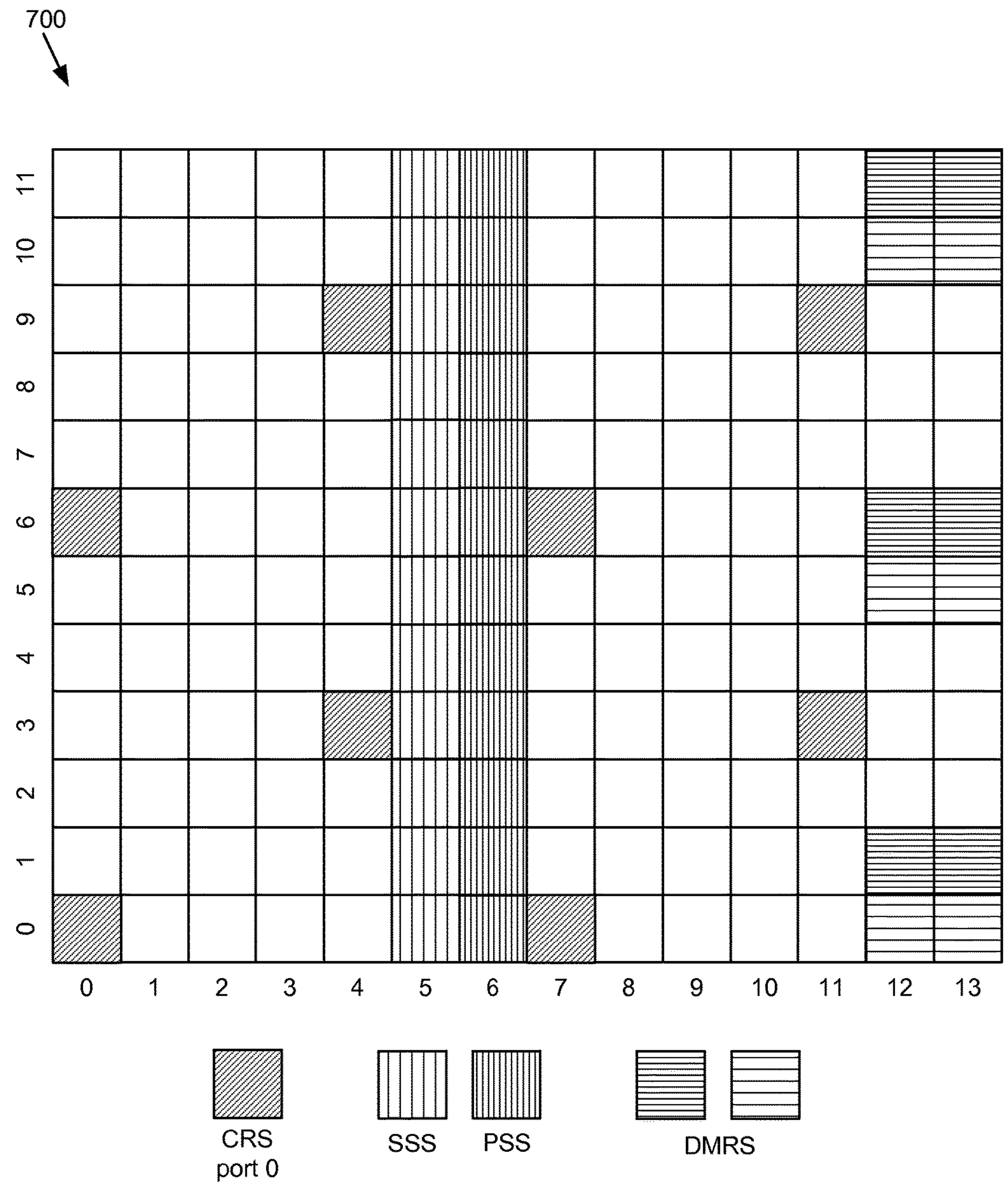
FIG. 7 is a block diagram illustrating the change of position of DMRS to avoid collisions with the PSS and the SSS in certain sub-frames of certain PRBs of the NCT for FDD mode transmission, consistent with various examples.

FIG. 7 depicts changes to the DMRS REs to avoid collisions with the PSS and the SSS in the NCT for FDD mode transmission. In many ways, FIG. 7 is the same as FIG. 2. FIG. 7 depicts two PRBs within a common sub-frame 700, employing a normal CP. The PSS, the SSS, the CRS, and the DMRS are all indicated by the same hatching patterns as in FIG. 2. The CRS occupies the same REs. The SSS and the PSS occupy the same time symbols as in FIG. 2, namely time symbol 5 and time symbol 6, respectively. However, FIG. 7 differs significantly insofar as only half as many REs are occupied with the DMRS.

DMRS REs have been removed from time symbol 5 and time symbol 6 in which collisions resulted, while the remaining half of the REs allocated for DMRS carry the DMRS in the same locations as in FIG. 2. Therefore, as can be appreciated, collision avoidance can come at a price to the accuracy of channel estimation.

Figure 8B:
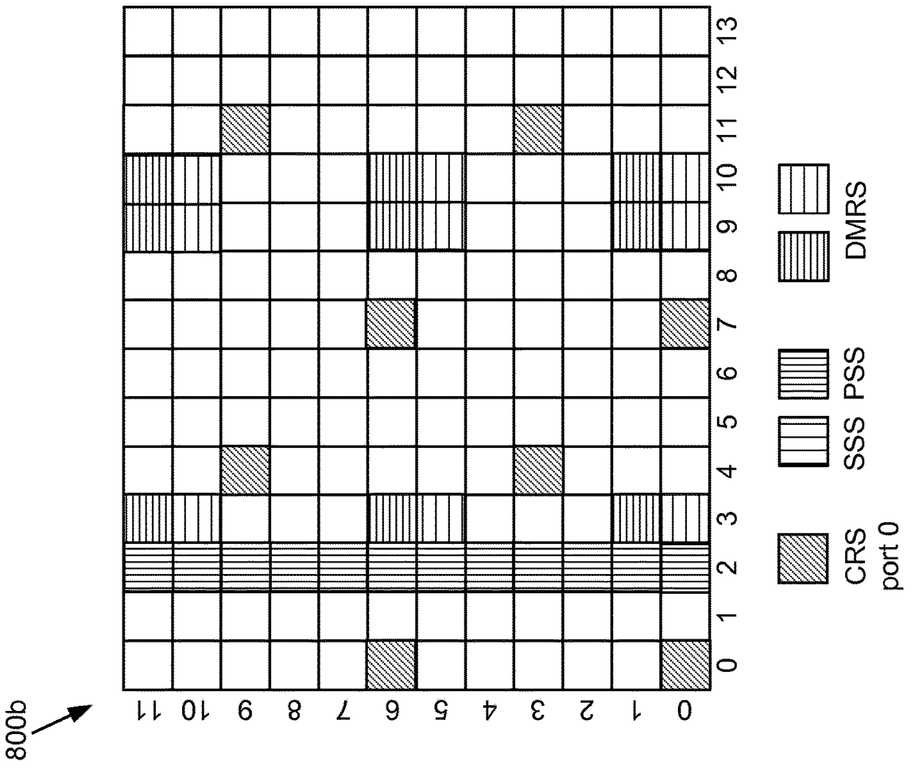
FIG. 8B is a block diagram illustrating the puncturing of DMRS by the PSS in sub-frame #1 and sub-frame #6 of the NCT for TDD mode transmission, consistent with various examples.
Figure 8A:
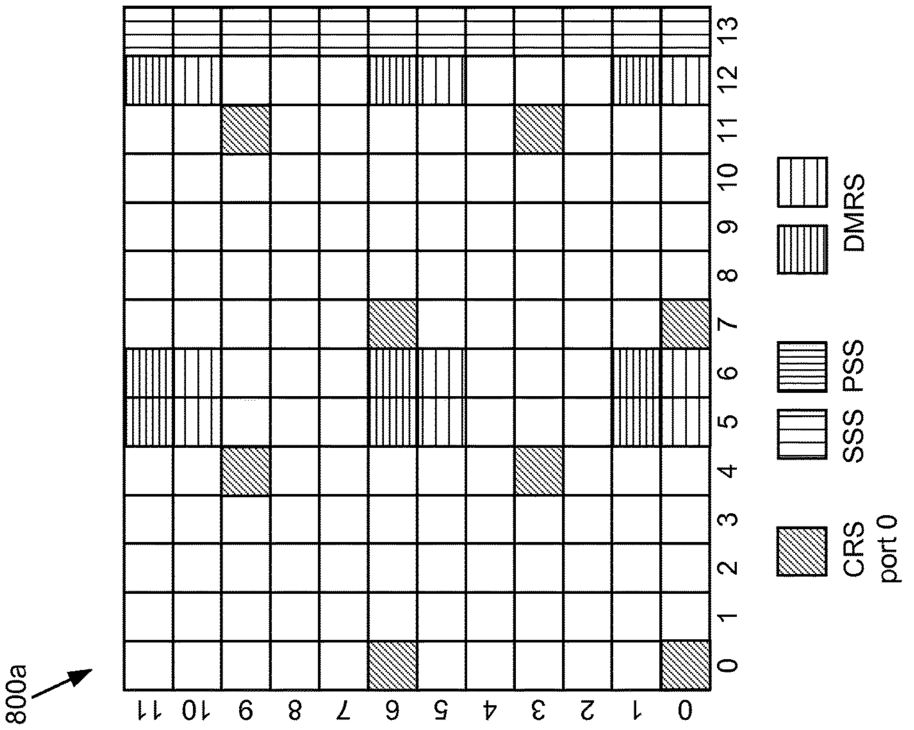
FIG. 8A is a block diagram illustrating the change of position of DMRS to avoid collisions with the SSS in sub-frame #0 and sub-frame #5 of certain PRBs of the NCT for TDD mode transmission, consistent with various examples.

FIG. 8A depicts changes to the DMRS to avoid collisions with the SSS in sub-frame #0 and sub-frame #5 of a radio frame for the NCT for TDD mode transmission, as opposed to FDD mode transmission. FIG. 8A is very much like FIG. 3A. The exception is that DMRS REs have been removed from the ultimate time symbol. As a result there are no collisions, but at a cost to channel estimation in sub-frame #0 and sub-frame #5.

FIG. 8B also depicts the puncturing of DMRS by the PSS in sub-frame #1 and sub-frame #6. Again, FIG. 8B is very much like FIG. 3B. However, the DMRS REs have again been removed from time symbol 2, occupied by the PSS. Again collision avoidance comes at a cost to channel estimation. As previously discussed, the additional cost can be mitigated by scheduling slow moving UEs in these PRBs for which such deterioration is a possibility.

Figure 9:
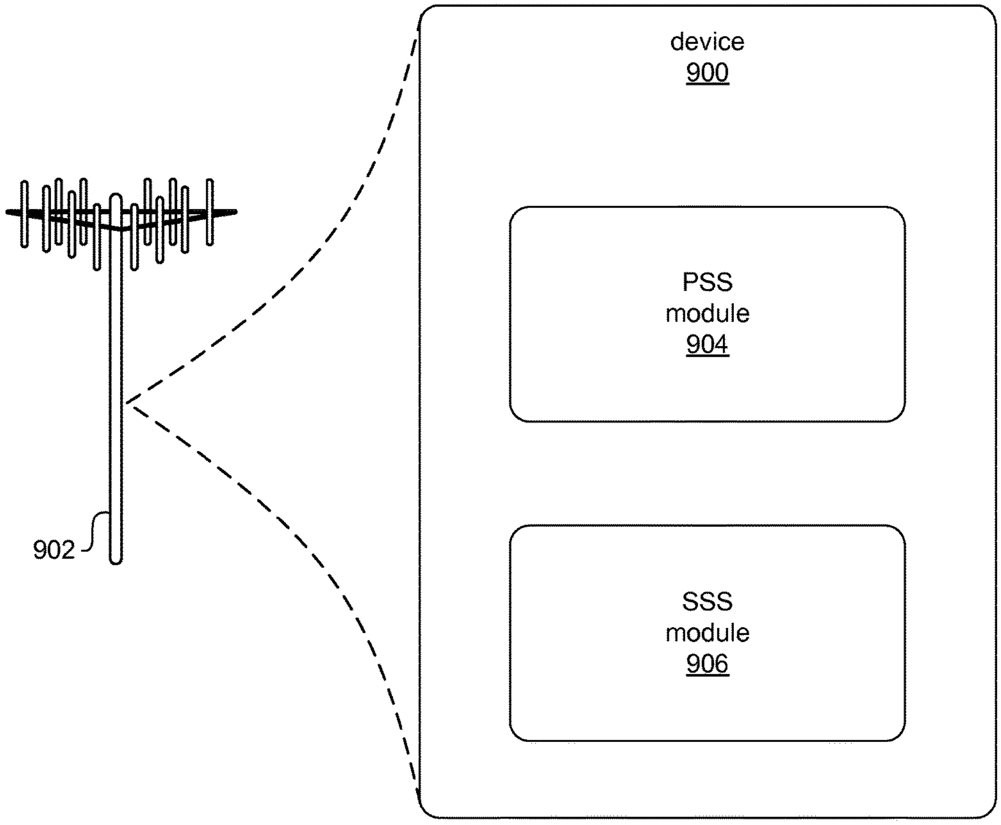
FIG. 9 is a block diagram illustrating a device at an evolved Node B (eNodeB) for providing a PSS and an SSS in an NCT for FDD mode transmission, consistent with various examples.

FIG. 9 depicts a device 900 at an eNodeB 902 for providing a PSS and/or an SSS in an NCT for FDD mode transmission. The device can comprise a PSS module 904 and an SSS module 906. The PSS module can be configured to schedule the PSS in time symbols of an OFDM radio frame. The time symbols can be located in a pair of slots. The pair of slots can be located in a pair of sub-frames separated by five milliseconds. The pair of sub-frames can be located within the OFDM radio frame of the NCT. The PSS can be positioned in time symbols to avoid a collision with another signal.

The PSS module 906 can be configured to schedule the SSS in time symbols in the OFDM radio frame. The time symbols can be located in a pair of slots. The pair of slots can be located in a pair of sub-frames separated by five milliseconds. The pair of sub-frames can be located within the OFDM radio frame pertaining to the NCT to avoid a collision with another signal.

In some examples, the PSS module 904 can be configured to schedule in time symbols comprising a first set of time symbols in a first pair of slots in a first pair of sub-frames for type I PRBs centered around a central frequency of a transmission bandwidth of the OFDM radio frame. As used in this specification type I PRB has a definition provided in the discussion with respect to FIG. 6. The time symbols can also comprise a second set of time symbols in a second pair of slots in a second pair of sub-frames for remaining PRBs within the transmission bandwidth of the OFDM radio frame.

In such examples, the SSS module 906 can be configured to schedule in time symbols comprising a third set of time symbols in a third pair of slots in a third pair of sub-frames for the type I PRBs. The time symbols can also comprise a fourth set of time symbols in a fourth pair of slots in a fourth pair of sub-frames for the remaining PRBs within the transmission bandwidth.

In certain examples, the PSS module 904 schedules the PSS in common time symbols for all PRBs. Also, the SSS module 906 schedules the SSS in common time symbols for all PRBs. However, in other examples, the PSS module is configured to schedule the PSS by scheduling the PSS in time symbol 1 of slot #0 of sub-frame #0 and sub-frame #5 for either a normal CP or an extended CP. For such examples, the SSS module 906 can be configured to schedule the SSS by scheduling the SSS in time symbol 2 of slot #0 of sub-frame #0 and sub-frame #5 for either a normal CP or an extended CP.

For some examples, the PSS module 904 can be configured to schedule the PSS by scheduling the PSS in time symbol 2 of slot #0 of sub-frame #0 and sub-frame #5 for one of a normal CP and an extended CP. Also, the SSS module 906 can be configured to schedule the SSS by scheduling the SSS in time symbol 1 of slot #0 of sub-frame #0 and sub-frame #5 for either a normal CP or an extended CP. In other examples, the PSS module can be configured to schedule the PSS by scheduling the PSS in time symbol 1 of slot #1 of sub-frame #0 and sub-frame #5 for either a normal CP or an extended CP. Also, the SSS module can be configured to schedule the SSS by scheduling the SSS in time symbol 2 of slot #1 of sub-frame #0 and sub-frame #5 for either a normal CP or an extended CP.

In certain examples, the PSS module 904 is configured to schedule the PSS by scheduling the PSS in time symbol 0 of slot #0 of sub-frame #4 and sub-frame #9 for either a normal CP or an extended CP. In such examples, the SSS module 906 can be configured to schedule the SSS by scheduling the SSS in time symbol 1 of slot #0 of sub-frame #4 and sub-frame #9 for either a normal CP or an extended CP. In other examples, the PSS module can be configured to schedule the PSS by scheduling the PSS in time symbol 0 of slot #0 of sub-frame #4 and sub-frame #9 for either a normal CP or an extended CP. For such examples, the SSS module can be configured to schedule the SSS by scheduling the SSS in time symbol 0 of slot #1 of sub-frame #4 and sub-frame #9 for either a normal CP or an extended CP.

In further examples, the PSS module 904 can be configured to schedule the PSS by scheduling the PSS in time symbol 2 of slot #1 of sub-frame #0 and sub-frame #5 for a normal CP. Also, the SSS module 906 can be configured to schedule the SSS by scheduling the SSS in time symbol 3 of slot #1 of sub-frame #0 and sub-frame #5 of a normal CP. For certain examples the PSS module can be configured to schedule the PSS by scheduling the PSS in time symbol 0 of slot #1 of sub-frame #4 and sub-frame #9 for a normal CP. For such examples, the SSS module can be configured to schedule the SSS by scheduling the SSS in time symbol 4 of slot #1 of sub-frame #4 and sub-frame #9 of a normal CP.

The PSS module 904 of some examples can be configured to schedule the PSS by scheduling the PSS in time symbol 0 of slot #1 of sub-frame #4 and sub-frame #9 for an extended CP. The SSS module 906 can be configured to schedule the SSS by scheduling the SSS in time symbol 3 of slot #1 of sub-frame #4 and sub-frame #9 of an extended CP.

In other examples, the PSS module can be configured to schedule the PSS by scheduling the PSS in one of time symbol 0 of slot #0 of sub-frame #4 and sub-frame #9, resulting in case 1, and time symbol 1 of slot #0 of sub-frame #4 and sub-frame #9, resulting in case 2. Both case 1 and case 2 can be applied for either a normal CP or an extended CP. In such examples, the SSS module is configured to schedule the SSS by scheduling the SSS in time symbol 1 of slot #0 of sub-frame #4 and sub-frame #9 for case 1 and symbol 0 of slot #0 of sub-frame #4 and sub-frame #9 for case 2. Both case 1 and case 2 can be applied for either a normal CP or an extended CP.

Figure 10:
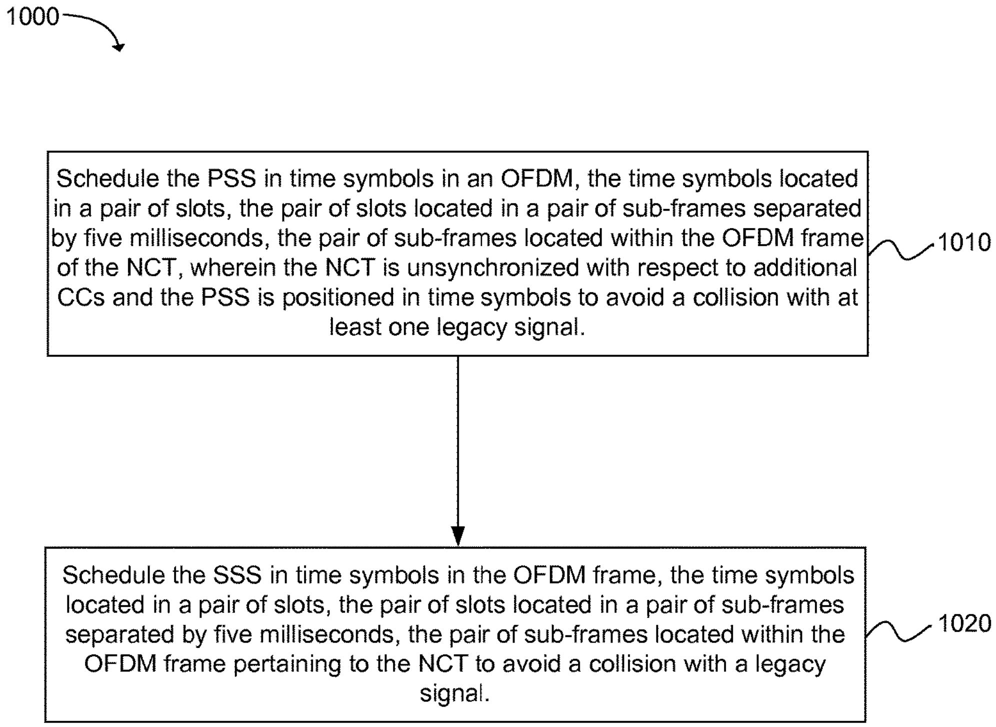
FIG. 10 is a flowchart depicting a process, operable on an eNodeB, to provide a PSS and an SSS in an NCT for TDD mode transmission, consistent with various examples.

FIG. 10 is a flowchart depicting a process 1000 to provide a PSS and an SSS in an NCT for TDD mode. The process can be implemented at an eNodeB having computer circuitry configured to schedule 1010 the PSS in time symbols of an OFDM radio frame. The time symbols can be located in a pair of slots. The pair of slots can be located in a pair of sub-frames separated by five milliseconds. The pair of sub-frames can be located within the OFDM radio frame of the NCT. The PSS can be positioned in time symbols to avoid a collision with another signal.

The process 1000 can also comprise scheduling 1020 the SSS in time symbols in the OFDM radio frame. The time symbols can be located in a pair of slots. The pair of slots can be located in a pair of sub-frames separated by five milliseconds. The pair of sub-frames can be located within the OFDM radio frame pertaining to the NCT to avoid a collision with another signal.

In some examples, the computer circuitry configured to schedule 1010 the PSS in the time symbols is further configured to schedule the PSS in time symbol 0 of slot #0 of sub-frame #1 and sub-frame #6 for either a normal CP or an extended CP. Computer circuitry configured to schedule 1020 the SSS in the time symbols is further configured to schedule the SSS in time symbol 1 of slot #0 of sub-frame #1 and sub-frame #6 for one of a normal CP and an extended CP.

The computer circuitry configured to schedule 1010 the PSS in the time symbols can be further configured to schedule the PSS in time symbol 0 of slot #0 of sub-frame #1 and sub-frame #6 for either a normal Cyclic Prefix (CP) or an extended CP. Also, computer circuitry configured to schedule 1020 the SSS in the time symbols can be further configured to schedule the SSS in time symbol 2 of slot #0 of sub-frame #0 and sub-frame #5 for either a normal CP or an extended CP. In other examples, the computer circuitry configured to schedule the PSS in the time symbols is further configured to schedule the PSS in time symbol 1 of slot #0 of sub-frame #1 and sub-frame #6 for either a normal CP or an extended CP. Also, the computer circuitry configured to schedule the SSS in the time symbols can be further configured to schedule the SSS in time symbol 1 of slot #0 of sub-frame #0 and sub-frame #5 for either a normal CP or an extended CP.

For certain examples, the computer circuitry can be configured to schedule 1010 the PSS in the time symbols can be further configured to schedule the PSS in time symbol 1 of slot #0 of sub-frame #1 and sub-frame #6 for one of a normal Cyclic Prefix (CP) and an extended CP. In such examples, the computer circuitry configured to schedule 1020 the SSS in the time symbols can be further configured to schedule the SSS in time symbol 2 of slot #0 of sub-frame #0 and sub-frame #5 for one of a normal CP and an extended CP.

In other examples, the computer circuitry configured to schedule 1010 the PSS in time symbols can be further configured to schedule the PSS for either a normal CP or an extended CP. The computer circuitry can schedule the PSS in time symbol 1 of slot #0 of sub-frame #0 and sub-frame #5, resulting in a first case. Also, the computer circuitry can schedule the PSS in time symbol 1 of slot #1 of sub-frame #0 and sub-frame #5, resulting in a second case. In such examples, the computer circuitry configured to schedule 1020 the SSS in time symbols can further be configured to schedule the SSS for a normal CP or an extended CP in time symbol 2 of slot #0 of sub-frame #0 and sub-frame #5 for the first case, or time symbol 3 of slot #1 of S sub-frame #0 and sub-frame #5 for the second case.

The computer circuitry configured to schedule 1010 the PSS in time symbols, for certain examples, can further be configured to schedule the PSS for one of a normal CP and an extended CP in time symbol 2 of slot #0 of sub-frame #0 and sub-frame #5. Also, the computer circuitry can be configured to schedule 1020 the SSS in time symbols can further be configured to schedule the SSS for one of a normal CP and an extended CP; in time symbol 1 of slot #0 of sub-frame #0 and sub-frame #5. In other examples, the computer circuitry configured to schedule the PSS in the time symbols can further be configured to schedule the PSS in time symbol 0 of slot #1 of sub-frame #1 and sub-frame #6 for a normal CP. For these examples, the computer circuitry configured to schedule the SSS in the time symbols can further be configured to schedule the SSS in time symbol 1 of slot #1 of sub-frame #1 and sub-frame #6 for a normal CP.

Some examples can have the computer circuitry configured to schedule 1010 the PSS in time symbols that is also further configured to schedule the PSS for an extended Cyclic Prefix (CP) in time symbol 2 of slot #0 of sub-frame #1 and sub-frame #6. For these examples, the computer circuitry configured to schedule 1020 the SSS in time symbols can further be configured to schedule the SSS for an extended CP in symbol 1 of slot #0 of sub-frame #0 and sub-frame #5, or symbol 2 of slot #0 of sub-frame #0 and sub-frame #5. The computer circuitry, of other examples, configured to schedule the PSS in time symbols can be further configured to schedule the PSS for either a normal CP or an extended CP in time symbol 2 of slot #0 of sub-frame #1 and sub-frame #6. The computer circuitry configured to schedule the SSS in time symbols in these examples can be further configured to schedule 1020 the SSS for either a normal CP or an extended CP in symbol 0 of slot #0 of sub-frame #1 and sub-frame #6, or symbol 1 of slot #0 of sub-frame #1 and sub-frame #6.

Also, certain examples can have computer circuitry configured to schedule 1010 the PSS in time symbols that can be further configured to schedule the PSS for a normal CP or an extended CP in time symbol 1 of slot #0 of sub-frame #1 and sub-frame #6. For these examples, the computer circuitry configured to schedule 1020 the SSS in time symbols can be further configured to schedule the SSS for either a normal CP or an extended CP in symbol 2 of slot #0 of sub-frame #1 and sub-frame #6.

Other examples can have computer circuitry configured to schedule 1010 the PSS in time symbols can be further configured to schedule the PSS for an extended CP. The computer circuitry can schedule the PSS in symbol 1 of slot #0 of sub-frame #1 and sub-frame #6, resulting in a first case. The computer circuitry can also schedule the PSS in symbol 1 of slot #0 of sub-frame #1 and sub-frame #5, resulting in a second case. In such examples, the computer circuitry configured to schedule 1020 the SSS in time symbols can be further configured to schedule the SSS for an extended CP in symbol 0 of slot #0 of sub-frame #1 and sub-frame #6 for the first case or symbol 2 of slot #0 of sub-frame #1 and sub-frame #5 for the second case.

Figure 11:
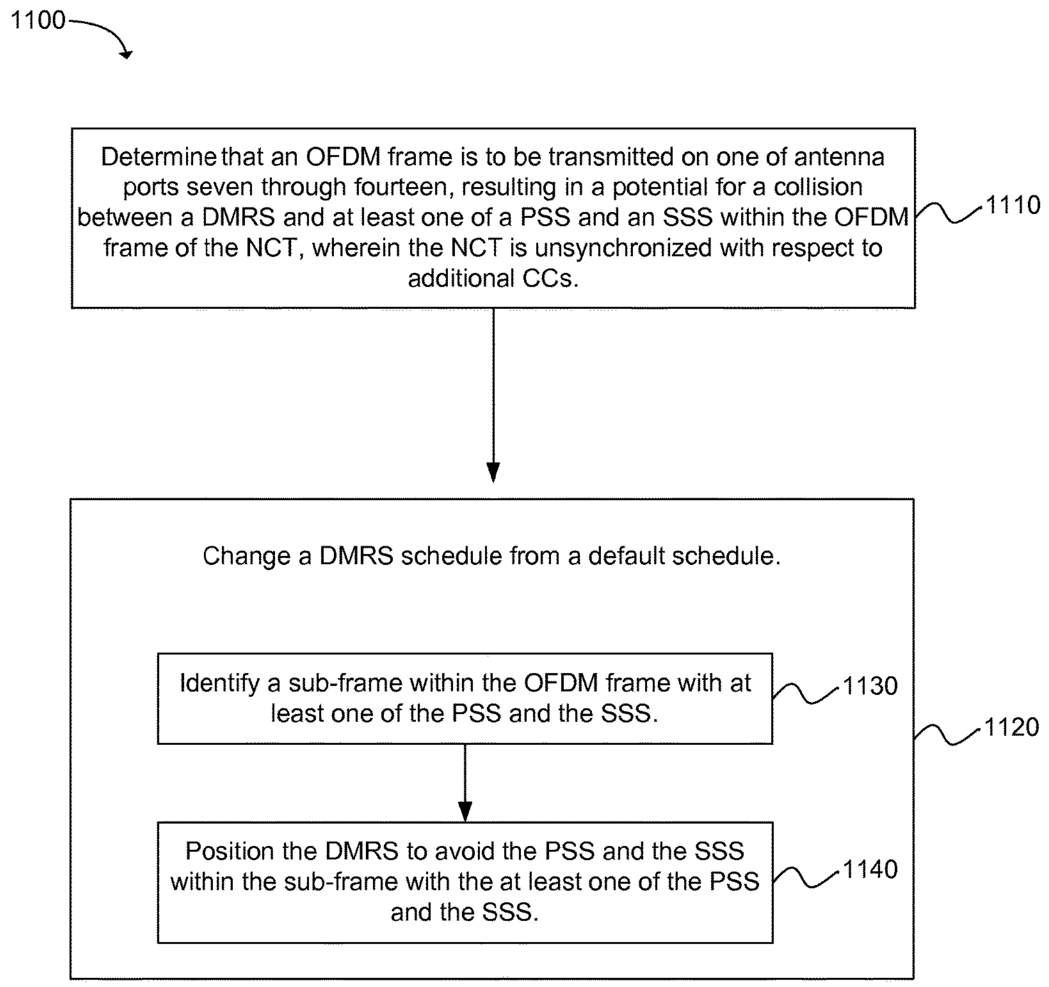
FIG. 11 is a flowchart depicting a process for avoiding collisions between a PSS and/or an SSS and one or more DMRS certain PRBs of an NCT by changing on or more DMRS mappings, consistent with various examples.

FIG. 11 is a flowchart depicting a process 1100 for avoiding collisions between at least one of a PSS and an SSS and a DMRS in an NCT through DMRS assignment. The process can comprise determining 1110 that an OFDM radio frame is to be transmitted on one of antenna ports seven through fourteen, resulting in a potential for a collision between a DMRS and at least one of a PSS and an SSS within the OFDM radio frame of the NCT. The process can further comprise changing 1120 a DMRS schedule from a default schedule. The DMRS schedule can be changed by identifying 1130 a sub-frame within the OFDM radio frame with at least one of the PSS and the SSS. Changing the DMRS schedule can further comprise positioning 1140 at least one DMRS to avoid the PSS and the SSS within the sub-frame with the at least one of the PSS and the SSS.

In some examples, changing 1120 the DMRS schedule can further comprise changing the DMRS schedule from a default schedule for placement within type I PRBs centered around a central frequency of a transmission bandwidth of the OFDM radio frame. However, in such examples, scheduling the DMRS for other PRBs within the transmission bandwidth can be based on the default schedule. In certain examples, changing the DMRS schedule can further comprise changing the DMRS schedule from the default schedule for placement within all PRBs within the transmission bandwidth of the OFDM radio frame.

For some examples for FDD mode transmission, changing 1120 the DMRS schedule can further comprise changing the DMRS schedule for sub-frame #0 and sub-frame #5 from the default schedule, where a normal CP is used. Changing the DMRS schedule can be accomplished by removing DMRS from time symbol 5 and time symbol 6, and leaving DMRS in time symbol 12 and time symbol 13. For certain examples, changing the DMRS schedule can also be accomplished by changing the DMRS schedule for sub-frame #0 and sub-frame #5 from the default schedule, where an extended CP is used, by removing DMRS from time symbol 4 and time symbol 5, and, leaving DMRS in time symbol 10 and time symbol 11 of the OFDM radio frame of an FDD mode transmission.

In certain examples for TDD mode transmission, changing 1120 the DMRS schedule can further comprise changing the DMRS schedule for sub-frame #0 and sub-frame #5 from the default schedule, where a normal CP is used, by removing DMRS from time symbol 13, and leaving DMRS in time symbol 5, time symbol 6, and time symbol 12. In another example, changing the DMRS schedule can also be accomplished by removing DMRS from time symbol 12 and time symbol 13, and leaving DMRS in time symbol 5 and time symbol 6. Also, changing the DMRS schedule for sub-frame #0 and sub-frame #5 from the default schedule, where an extended CP is used, can be accomplished by removing DMRS from time symbol 12 and time symbol 13, and leaving in time symbol 5 and time symbol 6. Alternatively, where an extended CP is used, changing the DMRS schedule for sub-frame #0 and sub-frame #5 from the default schedule can be accomplished by removing DMRS from time symbol 10 and time symbol 11, and leaving DMRS in time symbol 4 and time symbol 5.

In additional examples, changing the DMRS schedule for an OFDM radio frame further comprises, for a TDD mode transmission, changing the DMRS schedule for sub-frame #1 and sub-frame #6 from the default schedule. In some of such examples, where a normal Cyclic Prefix (CP) is used, and in case of special sub-frame configuration 1, 2, 6, and 7, one of the following approaches can be employed. Changing the DMRS schedule can be accomplished by removing DMRS from time symbol 2 and, leaving DMRS in time symbol 3, time symbol 5, and time symbol 6. Changing the DMRS schedule can also be accomplished by removing DMRS from time symbol 2 and time symbol 3, and leaving DMRS in time symbol 5 and time symbol 6.

In a case of special sub-frame configuration 3, 4, 8, and 9, for a TDD mode transmission, changing the DMRS schedule can be accomplished by removing DMRS from time symbol 2, and leaving DMRS in time symbol 3, time symbol 9, and time symbol 10. In such a case, changing the DMRS schedule can also be accomplished by removing DMRS from time symbol 2 and time symbol 3, and leaving DMRS in time symbol 9 and time symbol 10.

Alternatively, in cases of all other DL sub-frame structures (except for special sub-frame configuration 1, 2, 3, 4, 6, 7, 8, and 9), changing the DMRS schedule for sub-frame #6, but not sub-frame #1, from the default schedule, where a normal CP is used, can be accomplished by leaving DMRS in time symbol 5, time symbol 6, time symbol 12, and in time symbol 13, as would be the case in a legacy carrier, since there are no collisions. Conversely, where an extended CP is used, the DMRS schedule for sub-frame #1 and sub-frame #6 can be the same as the default schedule, since there are no collision with PSS.

An eNodeB, in some examples, can identify PRBs in which the scheduling of the DMRS has been changed. The eNodeB can also identify a subsets of UEs from a set of UEs connected to the eNodeB that have a speed of movement that is lower than a speed of movement of one or more UEs from the set of UEs. The eNodeB can also assign the PRBs in which the scheduling of the DMRS has been changed to the subset of UEs.

Figure 12:
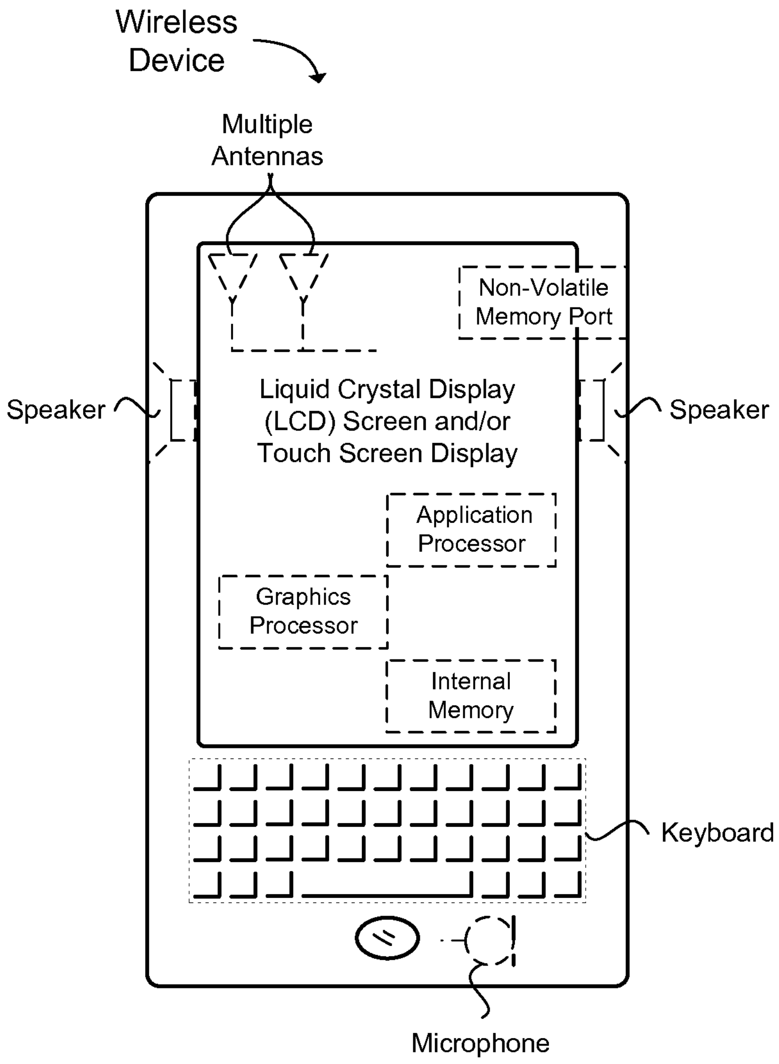
FIG. 12 is a block diagram of a UE in accordance with another example.

FIG. 12 provides an example illustration of a mobile device, such as UE, an MS, a mobile wireless mobile device, a mobile communication device, a tablet, a handset, or other type of mobile wireless mobile device. The mobile device can include one or more antennas configured to communicate with a WWAN transmission cell. While two antennas are shown, the device may have between one and four or more antennas. The mobile device can be configured to communicate using at least one wireless communication standard including 3GPP LTE, Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a Wireless Local Area Network (WLAN), a Wireless Personal Area Network (WPAN), and/or a WWAN.

FIG. 12 also provides an illustration of a microphone and one or more speakers that can be used for audio input and output from the mobile device. The display screen may be a Liquid Crystal Display (LCD) screen, or other type of display screen such as an Organic Light Emitting Diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. Non-volatile memory can include a Solid State Drive (SSD), Flash Random Access Memory (RAM), and so forth. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may be implemented in programmable hardware such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, Solid State Drives (SSD), flash RAM, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium (including volatile and non-volatile memory and/or storage elements), at least one input device, and at least one output device. One or more programs that may implement/utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one example" or "an example" means that a particular feature, structure, or characteristic described in connection with the example is included in at least one example of the present invention. Thus, appearances of the phrases "in one example" or "in an example" in various places throughout this specification are not necessarily all referring to the same example.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member based on their presentation in a common group without contrary indications. In addition, various examples of the present invention may be referred to herein along with alternatives for the various components thereof. It is understood that such examples, examples, and alternatives are not to be construed as de facto equivalents of one another, but are to be considered as separate and autonomous representations of the present invention.

Furthermore, the described features, structures, or characteristics may be combined in any suitable manner in one or more examples. In the following description, numerous specific details are provided, such as examples of materials, fasteners, sizes, lengths, widths, shapes, etc., to provide a thorough understanding of examples of the invention. One skilled in the relevant art will recognize, however, that the invention can be practiced without one or more of the specific details, or with other methods, components, materials, etc. In other instances, well-known structures, materials, or operations are not shown/described in detail to avoid obscuring aspects of the invention.

While the forgoing examples are illustrative of the principles of the present invention, it will be apparent to those of ordinary skill in the art that many modifications in form, usage and details of implementation can be made without the exercise of inventive faculty, and without departing from the principles/concepts of the invention. Accordingly, it is not intended that the invention be limited, except as by the claims.

What is claimed is:

1. An apparatus at an evolved Node B (eNodeB) for providing a Primary Synchronization Signal (PSS) and a Secondary Synchronization Signal (SSS) in a New Carrier Type (NCT) for Frequency Division Duplex (FDD) mode, the apparatus comprising:

one or more processors; and a memory storing instructions to be executed by the one or more processors to:

schedule the PSS in time symbols of an Orthogonal Frequency Division Multiplexing (OFDM) radio frame, the time symbols located in a pair of slots, the pair of slots located in a pair of sub-frames separated by five milliseconds, the pair of sub-frames located within the OFDM radio frame of the NCT; and schedule the SSS in time symbols in the OFDM radio frame, the time symbols located in a pair of slots, the pair of slots located in a pair of sub-frames separated by five milliseconds, the pair of sub-frames located within the OFDM radio frame pertaining to the NCT, wherein demodulation reference signals (DMRS) are removed in time symbols of physical resource blocks (PRBs) within the OFDM radio frame of the NCT that are occupied by the PSS and the SSS to avoid collisions between the PSS and the SSS within the DMRS, and the eNodeB is configured to schedule slow moving user equipment (UEs) in the PRBs due to a reduced DMRS density in the PRBs within the OFDM radio frame of the NCT.

2. The apparatus of claim 1, wherein the one or more processors and memory are configured to schedule the PSS in time symbols comprising:

a first set of time symbols in a first pair of slots in a first pair of sub-frames for type I Physical Resource Blocks (PRBs) centered around a central frequency of a transmission bandwidth of the OFDM radio frame, and a second set of time symbols in a second pair of slots in a second pair of sub-frames for remaining PRBs within the transmission bandwidth of the OFDM radio frame; and the one or more processors and memory are configured to schedule the SSS in time symbols comprising:

a third set of time symbols in a third pair of slots in a third pair of sub-frames for the type I PRBs, and a fourth set of time symbols in a fourth pair of slots in a fourth pair of sub-frames for the remaining PRBs within the transmission bandwidth.

3. The apparatus of claim 1, wherein the one or more processors and memory are configured to:

schedule the PSS by scheduling the PSS in time symbol 1 of slot #0 of sub-frame #0 and sub-frame #5 for one of a normal Cyclic Prefix (CP) and an extended CP; and schedule the SSS by scheduling the SSS in time symbol 2 of slot #0 of sub-frame #0 and sub-frame #5 for one of a normal CP and an extended CP.

4. The apparatus of claim 1, wherein the one or more processors and memory are configured to:

schedule the PSS by scheduling the PSS in time symbol 2 of slot #0 of sub-frame #0 and sub-frame #5 for one of a normal Cyclic Prefix (CP) and an extended CP; and schedule the SSS by scheduling the SSS in time symbol 1 of slot #0 of sub-frame #0 and sub-frame #5 for one of a normal CP and an extended CP.

5. The apparatus of claim 1, wherein the one or more processors and memory are configured to:

schedule the PSS by scheduling the PSS in time symbol 1 of slot #1 of sub-frame #0 and sub-frame #5 for one of a normal Cyclic Prefix (CP) and an extended CP; and schedule the SSS by scheduling the SSS in time symbol 2 of slot #1 of sub-frame #0 and sub-frame #5 for one of a normal CP and an extended CP.

6. The apparatus of claim 1, wherein the one or more processors and memory are configured to:

schedule the PSS by scheduling the PSS in time symbol 0 of slot #0 of sub-frame #4 and sub-frame #9 for one of a normal Cyclic Prefix (CP) and an extended CP; and schedule the SSS by scheduling the SSS in time symbol 1 of slot #0 of sub-frame #4 and sub-frame #9 for one of a normal CP and an extended CP.

7. The apparatus of claim 1, wherein the one or more processors and memory are configured to:

schedule the PSS by scheduling the PSS in time symbol 0 of slot #0 of sub-frame #4 and sub-frame #9 for one of a normal Cyclic Prefix (CP) and an extended CP; and schedule the SSS by scheduling the SSS in time symbol 0 of slot #1 of sub-frame #4 and sub-frame #9 for one of a normal CP and an extended CP.

8. The apparatus of claim 1, wherein the one or more processors and memory are configured to:

schedule the PSS by scheduling the PSS in time symbol 2 of slot #1 of sub-frame #0 and sub-frame #5 for a normal Cyclic Prefix (CP); and schedule the SSS by scheduling the SSS in time symbol 3 of slot #1 of sub-frame #0 and sub-frame #5 of a normal CP.

9. The apparatus of claim 1, wherein the one or more processors and memory are configured to:

schedule the PSS by scheduling the PSS in time symbol 0 of slot #1 of sub-frame #4 and sub-frame #9 for a normal Cyclic Prefix (CP); and schedule the SSS by scheduling the SSS in time symbol 4 of slot #1 of sub-frame #4 and sub-frame #9 of a normal CP.

10. The apparatus of claim 1, wherein the one or more processors and memory are configured to:

schedule the PSS by scheduling the PSS in time symbol 0 of slot #1 of sub-frame #4 and sub-frame #9 for an extended Cyclic Prefix (CP); and schedule the SSS by scheduling the SSS in time symbol 3 of slot #1 of sub-frame #4 and sub-frame #9 of an extended CP.

11. The apparatus of claim 1, wherein the one or more processors and memory are configured to:

schedule the PSS by scheduling the PSS in time symbol 0 of slot #0 of sub-frame #4 and sub-frame #9 for one of a normal Cyclic Prefix (CP) and an extended CP; and schedule the SSS by scheduling the SSS in time symbol 1 of slot #0 of sub-frame #4 and sub-frame #9 for one of a normal CP and an extended CP.

12. The apparatus of claim 1, wherein the one or more processors and memory are configured to:

schedule the PSS by scheduling the PSS in time symbol 1 of slot #0 of sub-frame #4 and sub-frame #9 for one of a normal Cyclic Prefix (CP) and an extended CP; and schedule the SSS by scheduling the SSS in symbol 0 of slot #0 of sub-frame #4 and sub-frame #9 for one of a normal CP and an extended CP.

13. An evolved Node B (eNodeB) configured to provide a Primary Synchronization Signal (PSS) and a Secondary Synchronization Signal (SSS) in a New Carrier Type (NCT) for Time Division Duplex (TDD) mode, including:

one or more processors; and a memory storing instructions to be executed by the one or more processors to:

schedule the PSS in time symbols of an Orthogonal Frequency Division Multiplexing (OFDM) radio frame, the time symbols located in a pair of slots, the pair of slots located in a pair of sub-frames separated by five milliseconds, the pair of sub-frames located within the OFDM radio frame of the NCT; and schedule the SSS in time symbols in the OFDM radio frame, the time symbols located in a pair of slots, the pair of slots located in a pair of sub-frames separated by five milliseconds, the pair of sub-frames located within the OFDM radio frame pertaining to the NCT, wherein demodulation reference signals (DMRS) are removed in time symbols of physical resource blocks (PRBs) within the OFDM radio frame of the NCT that are occupied by the PSS and the SSS to avoid collisions between the PSS and the SSS within the DMRS, and the eNodeB is configured to schedule slow moving user equipment (UEs) in the PRBs due to a reduced DMRS density in the PRBs within the OFDM radio frame of the NCT.

14. The eNodeB of claim 13, wherein the one or more processors and memory are further configured to:

schedule the PSS in the time symbols is further configured to schedule the PSS in time symbol 0 of slot #0 of sub-frame #1 and sub-frame #6 for one of a normal Cyclic Prefix (CP) and an extended CP; and schedule the SSS in the time symbols is further configured to schedule the SSS in time symbol 1 of slot #0 of sub-frame #0 and sub-frame #5 for one of a normal CP and an extended CP.

15. The eNodeB of claim 13, wherein the one or more processors and memory are further configured to:

schedule the PSS in the time symbols is further configured to schedule the PSS in time symbol 0 of slot #0 of sub-frame #1 and sub-frame #6 for one of a normal Cyclic Prefix (CP) and an extended CP; and schedule the SSS in the time symbols is further configured to schedule the SSS in time symbol 2 of slot #0 of sub-frame #0 and sub-frame #5 for one of a normal CP and an extended CP.

16. The eNodeB of claim 13, wherein the one or more processors and memory are further configured to:

schedule the PSS in the time symbols is further configured to schedule the PSS in time symbol 1 of slot #0 of sub-frame #1 and sub-frame #6 for one of a normal Cyclic Prefix (CP) and an extended CP; and schedule the SSS in the time symbols is further configured to schedule the SSS in time symbol 1 of slot #0 of sub-frame #0 and sub-frame #5 for one of a normal CP and an extended CP.

17. The eNodeB of claim 13, wherein the one or more processors and memory are further configured to:

schedule the PSS in the time symbols is further configured to schedule the PSS in time symbol 1 of slot #0 of sub-frame #1 and sub-frame #6 for one of a normal Cyclic Prefix (CP) and an extended CP; and schedule the SSS in the time symbols is further configured to schedule the SSS in time symbol 2 of slot #0 of sub-frame #0 and sub-frame #5 for one of a normal CP and an extended CP.

18. The eNodeB of claim 13, wherein the one or more processors and memory are further configured to:

schedule the PSS in time symbols is further configured to schedule the PSS for one of a normal Cyclic Prefix (CP) and an extended CP in time symbol 1 of slot #0 of sub-frame #0 and sub-frame #5; and schedule the SSS in time symbols is further configured to schedule the SSS for one of a normal CP and an extended CP in time symbol 2 of slot #0 of sub-frame #0 and sub-frame #5 for the first case.

19. The eNodeB of claim 13, wherein the one or more processors and memory are further configured to:

schedule the PSS in time symbols is further configured to schedule the PSS for one of a normal Cyclic Prefix (CP) and an extended CP in time symbol 1 of slot #1 of sub-frame #0 and sub-frame #5; and schedule the SSS in time symbols is further configured to schedule the SSS for one of a normal CP and an extended CP in time symbol 3 of slot #1 of sub-frame #0 and sub-frame #5.

20. The eNodeB of claim 13, wherein the one or more processors and memory are further configured to:

schedule the PSS in time symbols is further configured to schedule the PSS for one of a normal Cyclic Prefix (CP) and an extended CP in time symbol 2 of slot #0 of sub-frame #0 and sub-frame #5; and schedule the SSS in time symbols is further configured to schedule the SSS for one of a normal CP and an extended CP; in time symbol 1 of slot #0 of sub-frame #0 and sub-frame #5.

21. The eNodeB of claim 13, wherein the one or more processors and memory are further configured to:

schedule the PSS in the time symbols is further configured to schedule the PSS in time symbol 0 of slot #1 of sub-frame #1 and sub-frame #6 for a normal Cyclic Prefix (CP); and schedule the SSS in the time symbols is further configured to schedule the SSS in time symbol 1 of slot #1 of sub-frame #1 and sub-frame #6 for a normal CP.

22. The eNodeB of claim 13, wherein the one or more processors and memory are further configured to:

schedule the PSS in time symbols is further configured to schedule the PSS for an extended Cyclic Prefix (CP) in time symbol 2 of slot #0 of sub-frame #1 and sub-frame #6, and schedule the SSS in time symbols is further configured to schedule the SSS for an extended CP; in one of:

symbol 1 of slot #0 of sub-frame #0 and sub-frame #5, and symbol 2 of slot #0 of sub-frame #0 and sub-frame #5.

23. The eNodeB of claim 13, wherein the one or more processors and memory are further configured to:

schedule the PSS in time symbols is further configured to schedule the PSS for one of a normal Cyclic Prefix (CP) and an extended CP in time symbol 2 of slot #0 of sub-frame #1 and sub-frame #6, and schedule the SSS in time symbols is further configured to schedule the SSS for one of a normal CP and an extended CP; in one of:

symbol 0 of slot #0 of sub-frame #1 and sub-frame #6, and symbol 1 of slot #0 of sub-frame #1 and sub-frame #6.

24. The eNodeB of claim 13, wherein the one or more processors and memory are further configured to:

schedule the PSS in time symbols is further configured to schedule the PSS for one of a normal Cyclic Prefix (CP) and an extended CP in time symbol 1 of slot #0 of sub-frame #1 and sub-frame #6, and schedule the SSS in time symbols is further configured to schedule the SSS for one of a normal CP and an extended CP; in symbol 2 of slot #0 of sub-frame #1 and sub-frame #6.

25. The eNodeB of claim 13, wherein the one or more processors and memory are further configured to:

schedule the PSS in time symbols is further configured to schedule the PSS for an extended Cyclic Prefix (CP) in symbol 1 of slot #0 of sub-frame #1 and sub-frame #6; and schedule the SSS in time symbols is further configured to schedule the SSS for an extended CP in symbol 0 of slot #0 of sub-frame #1 and sub-frame #6.

26. The eNodeB of claim 13, wherein the one or more processors and memory are further configured to:

schedule the PSS in time symbols is further configured to schedule the PSS for an extended Cyclic Prefix (CP) in symbol 1 of slot #0 of sub-frame #1 and sub-frame #5; and schedule the SSS in time symbols is further configured to schedule the SSS for an extended CP in symbol 2 of slot #0 of sub-frame #1 and sub-frame #5.

27. A non-transitory computer-readable storage medium containing instructions thereon which, when executed by one or more processors, perform the following:

scheduling a Primary Synchronization Signal (PSS) in time symbols of an Orthogonal Frequency Division Multiplexing (OFDM) radio frame, the time symbols located in a pair of slots, the pair of slots located in a pair of sub-frames separated by five milliseconds, the pair of sub-frames located within the OFDM radio frame of a New Carrier Type (NCT); and scheduling a Secondary Synchronization Signal (SSS) in time symbols in the OFDM radio frame, the time symbols located in a pair of slots, the pair of slots located in a pair of sub-frames separated by five milliseconds, the pair of sub-frames located within the OFDM radio frame pertaining to the NCT, wherein demodulation reference signals (DMRS) are removed in time symbols of physical resource blocks (PRBs) within the OFDM radio frame of the NCT that are occupied by the PSS and the SSS to avoid collisions between the PSS and the SSS with the DMRS, and an eNodeB is configured to schedule slow moving user equipment (UEs) in the PRBs due to a reduced DMRS density in the PRBs within the OFDM radio frame of the NCT.

28. The non-transitory computer-readable storage medium of claim 27, further containing instructions thereon which, when executed by one or more processors, perform the following:

scheduling the PSS in time symbols comprising:

a first set of time symbols in a first pair of slots in a first pair of sub-frames for type I Physical Resource Blocks (PRBs) centered around a central frequency of a transmission bandwidth of the OFDM radio frame, and a second set of time symbols in a second pair of slots in a second pair of sub-frames for remaining PRBs within the transmission bandwidth of the OFDM radio frame; and scheduling the SSS in time symbols comprising:

a third set of time symbols in a third pair of slots in a third pair of sub-frames for the type I PRBs, and a fourth set of time symbols in a fourth pair of slots in a fourth pair of sub-frames for the remaining PRBs within the transmission bandwidth.

29. The non-transitory computer-readable storage medium of claim 27, further containing instructions thereon which, when executed by one or more processors, perform the following:

scheduling the PSS by scheduling the PSS in time symbol 1 of slot #0 of sub-frame #0 and sub-frame #5 for one of a normal Cyclic Prefix (CP) and an extended CP; and scheduling the SSS by scheduling the SSS in time symbol 2 of slot #0 of sub-frame #0 and sub-frame #5 for one of a normal CP and an extended CP.

30. The non-transitory computer-readable storage medium of claim 27, further containing instructions thereon which, when executed by one or more processors, perform the following:

scheduling the PSS by scheduling the PSS in time symbol 2 of slot #0 of sub-frame #0 and sub-frame #5 for one of a normal Cyclic Prefix (CP) and an extended CP; and scheduling the SSS by scheduling the SSS in time symbol 1 of slot #0 of sub-frame #0 and sub-frame #5 for one of a normal CP and an extended CP.

* * * * *